(12) United States Patent
Kozawa

(10) Patent No.: US 10,816,474 B2
(45) Date of Patent: Oct. 27, 2020

(54) OPTICAL INFORMATION DETECTION APPARATUS AND MICROSCOPE SYSTEM

(71) Applicant: Tohoku University, Sendai-shi (JP)

(72) Inventor: Yuichi Kozawa, Sendai (JP)

(73) Assignee: Tohoku University, Sendai-shi (JP)

( * ) Notice: Subject to any disclaimer, the term of this patent is extended or adjusted under 35 U.S.C. 154(b) by 187 days.

(21) Appl. No.: 16/210,929

(22) Filed: Dec. 5, 2018

(65) Prior Publication Data

US 2019/0113458 A1  Apr. 18, 2019

Related U.S. Application Data

(63) Continuation of application No. PCT/JP2017/021138, filed on Jun. 7, 2017.

(30) Foreign Application Priority Data

Jun. 7, 2016 (JP) .................................. 2016-113770

(51) Int. Cl.
*G01N 21/17* (2006.01)
*G01N 21/64* (2006.01)
(Continued)

(52) U.S. Cl.
CPC ......... *G01N 21/6458* (2013.01); *G01N 21/17* (2013.01); *G01N 21/64* (2013.01);
(Continued)

(58) Field of Classification Search
CPC ........... G01N 2021/6463; G01N 21/17; G01N 21/64; G01N 21/6458; G01N 2201/061;
(Continued)

(56) References Cited

U.S. PATENT DOCUMENTS 6,150,666 A * 11/2000 Engelhardt ............ A61C 19/04
250/216
2014/0347462 A1  11/2014 Schanne-Klein et al.

FOREIGN PATENT DOCUMENTS

JP    H04-171415 A    6/1992
JP    05-173077 A     7/1993
(Continued)

OTHER PUBLICATIONS

International Search Report for International Application No. PCT/JP2017/021138 dated Sep. 12, 2017.
(Continued)

*Primary Examiner* — David P Porta
*Assistant Examiner* — Fani Boosalis
(74) *Attorney, Agent, or Firm* — Wolf, Greenfield & Sacks, P.C.

(57) ABSTRACT

An optical information detection apparatus includes: a needle-shaped light spot irradiation part that is configured to generate needle-shaped light spot concentrated over a length dimension g greater than a width dimension w along an optical axis, a shifting light spot conversion part that is configured to convert emission light emitted from positions of a detection object into shifting light spot, a shifting light spot reception part that is configured to receive the shifting light spot along a light-receiving plane, and an optical information acquisition part that is configured to acquire optical information from the positions from the shifting light spot.

8 Claims, 21 Drawing Sheets

(51) Int. Cl.
  *G02B 21/36*  (2006.01)
  *G02B 21/06*  (2006.01)
  *G02B 21/00*  (2006.01)

(52) U.S. Cl.
  CPC ..... *G02B 21/0032* (2013.01); *G02B 21/0076* (2013.01); *G02B 21/06* (2013.01); *G02B 21/36* (2013.01); *G01N 2021/6463* (2013.01); *G01N 2201/061* (2013.01)

(58) Field of Classification Search
  CPC ................ G02B 21/06; G02B 21/0032; G02B 21/0076; G02B 21/36
  See application file for complete search history.

(56) References Cited

FOREIGN PATENT DOCUMENTS

| | | |
|---|---|---|
| JP | 2001-511902 A | 8/2001 |
| JP | 2009-186509 A | 8/2009 |
| JP | 2013-167654 A | 8/2013 |
| JP | 2015-001708 A | 1/2015 |
| JP | 2015-504177 A | 2/2015 |
| WO | WO 98/25171 A1 | 6/1998 |

OTHER PUBLICATIONS

Japanese Communication for Application No. 2018-521751 dated Mar. 12, 2019.

\* cited by examiner

PUPIL OF OBJECTIVE LENS

ANNULAR LIGHT THAT IS FORMED

OPTICAL INFORMATION DETECTION APPARATUS AND MICROSCOPE SYSTEM

CROSS REFERENCE TO RELATED APPLICATIONS

This application is a continuation application based on a PCT Patent Application No. PCT/JP2017/021138, filed Jun. 7, 2017, whose priority is claimed on Japanese Application No. 2016-113770, filed on Jun. 7, 2016, the entire content of which are hereby incorporated by reference.

BACKGROUND OF THE INVENTION

Field of the Invention

The present invention relates to an optical information detection apparatus and a microscope system.

Description of the Related Art

Laser light is coherent light of which a phase is arranged, and has characteristics in which directivity and monochromaticity are excellent, and luminance is high, and thus the laser light is applied to various fields including image processing, communication, measurement, and a medical field. As one of laser microscopes using a laser light source that emits laser light as a light source for microscopes, there is a scanning laser microscope. The scanning laser microscope is an apparatus that observes a sample (detection object) by scanning with the laser light as beams, and is frequently used as a fluorescent microscope that observes the sample by observing a fluorescent or phosphorescent phenomenon from the sample irradiated with light having high optical intensity. In recent years, a fluorescent microscope using the scanning laser microscope has been used in analysis of a time response with respect to stimulus of a biological material, and the like.

For example, Japanese Unexamined Patent Application, First Publication No. Hei5-173077 discloses a scanning laser microscope in which an irradiation means that irradiates a sample with laser beams includes a shutter that appropriately blocks the laser beams, and a means that controls opening/closing of the shutter. In the scanning laser microscope, scanning with beams is initiated by a scanning means that performs scanning with laser beams before the shutter is opened, and the scanning is continued even after the shutter is closed.

In the scanning laser microscope described in Japanese Unexamined Patent Application. First Publication No. Hei5-173077, scanning with the laser beams is initiated before the shutter is opened and the sample is irradiated with the laser beams. A scanning speed of the laser beams reaches a predetermined speed before the shutter is opened, and thus a response delay caused by a mechanical mechanism at the time of initiating scanning disappears. Since the scanning with the laser beams is continued even after the shutter is closed by the scanning means, information that is substantially necessary to form an image, that is, an output of an optical detector is taken to an image forming means while the shutter is opened, and an image is formed on the basis of the information. As a result, it is possible to shorten a time necessary for scanning with the laser beams, that is, a time necessary for observation of the sample.

SUMMARY

An optical information detection apparatus to a first aspect of present invention includes: a needle-shaped light spot irradiation part that is configured to generate needle-shaped light spot that is concentrated over a length dimension greater than a width dimension concentrated in a direction orthogonal to a first optical axis along the first optical axis, and irradiates a detection object with the needle-shaped light spot; a shifting light spot conversion part that is configured to convert emission light emitted from a position on the first optical axis inside an irradiation region of the needle-shaped light spot in the detection object into shifting light spot that shifts so that a converging position on a light-receiving plane intersecting a second optical axis varies in correspondence with the position, from which the emission light is emitted, on the first optical axis in the detection object in accordance with movement of the emission light along the second optical axis; a shifting light spot reception part that is configured to receive the shifting light spot along the light-receiving plane; and an optical information acquisition part that is configured to acquire optical information of the emission position of the emission light from the shifting light spot received by the shifting light spot reception part.

As a second aspect of the present invention, in the optical information detection apparatus according to the first aspect, the needle-shaped light spot irradiation part may include a light source, an optical modulation part that is configured to modulate light emitted from the light source to convert the light emitted from the light source into the needle-shaped light spot, and a needle-shaped light spot generation part that is configured to focus the light modulated by the optical modulation part to the detection object, and generate the needle-shaped light spot.

As a third aspect of the present invention, in the optical information detection apparatus according to the first aspect, the needle-shaped light spot may be a Bessel beam having a high-optical-intensity portion on the first optical axis.

As a fourth aspect of the present invention, in the optical information detection apparatus according to the first aspect, the shifting light spot conversion part may include an emission light modulation part that is configured to convert the emission light into the shifting light spot by modulating the emission light.

As a fifth aspect of the present invention, in the optical information detection apparatus according to the first aspect, the shifting light spot may be an Airy beam that is curved in a parabolic shape with respect to the second optical axis.

A microscope system to a sixth aspect of present invention includes: a needle-shaped light spot irradiation part that is configured to generate needle-shaped light spot that is concentrated over a length dimension greater than a width dimension concentrated in a direction orthogonal to a first optical axis along the first optical axis, and irradiates a detection object with the needle-shaped light spot; a shifting light spot conversion part that is configured to convert emission light emitted from a position on the first optical axis inside an irradiation region of the needle-shaped light spot in the detection object into shifting light spot that shifts so that a converging position on a light-receiving plane intersecting a second optical axis varies in correspondence with the position, from which the emission light is emitted, on the first optical axis in the detection object in accordance with movement of the emission light along the second optical axis; a shifting light spot reception part that is configured to receive the shifting light spot along the light-receiving plane; and an optical information acquisition part that is configured to acquire optical information of the emission position of the emission light from the shifting light spot received by the shifting light spot reception part;

and an image information creation part that is configured to create image information related to the detection object on the basis of optical information that is acquired from the shifting light spot by the optical information acquisition part.

DETAILED DESCRIPTION OF THE PREFERRED EMBODIMENTS

Hereinafter, the invention will be described in detail with reference to the accompanying drawings. Furthermore, the drawings which are used in the following description are schematic drawings, and ratios of length, width, and thickness, and the like are not limited to actual ratios and the like, and can be appropriately changed.

Figure 1:
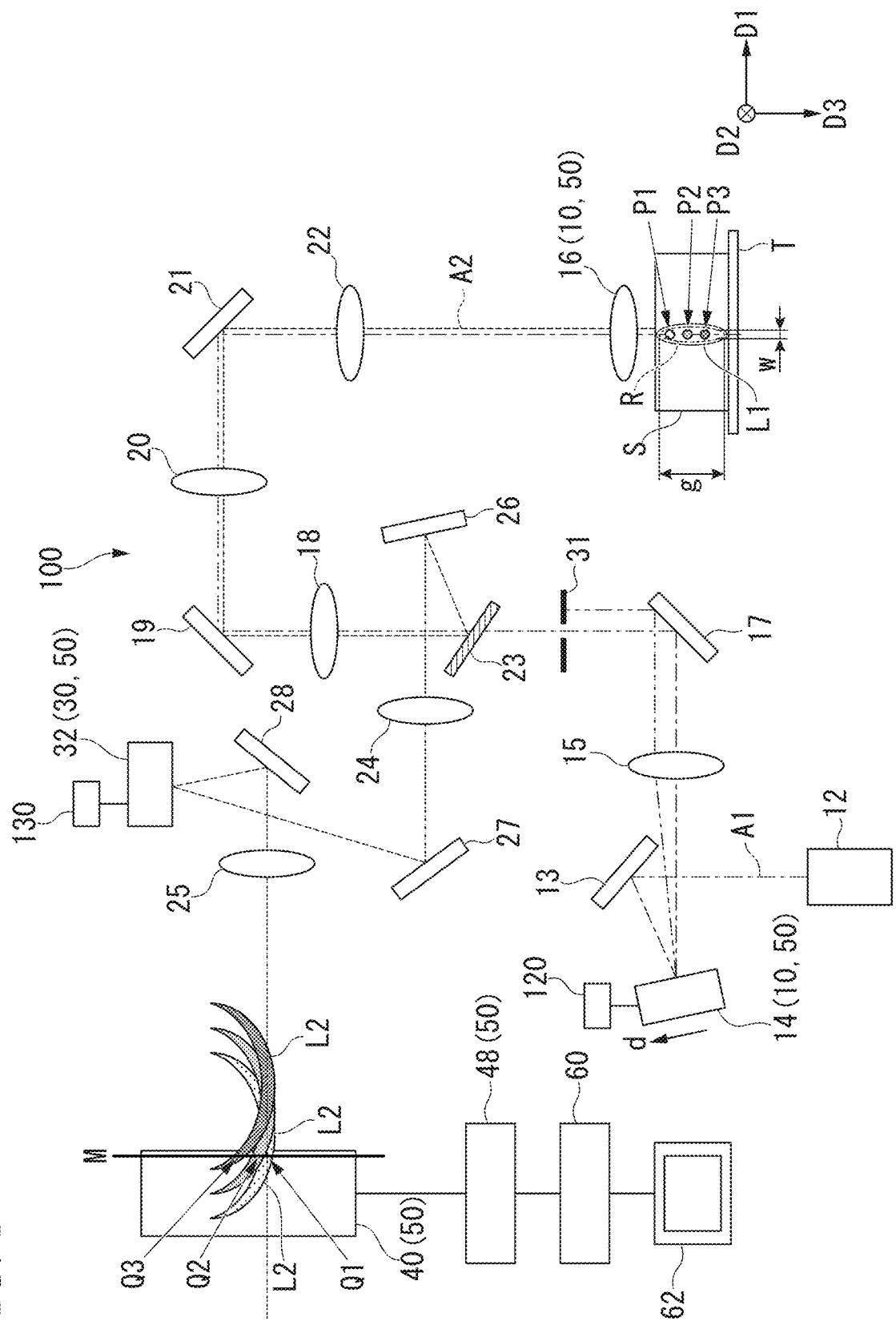
FIG. 1 is a schematic view of an optical information detection apparatus according to an aspect of the invention.

FIG. 1 is a schematic view of a microscope system 100 according to an aspect of the invention.

As shown in FIG. 1, the microscope system 100 includes at least an optical information detection apparatus 50, and also includes an image information creation part 60.

[Optical Information Detection Apparatus]

The optical information detection apparatus 50 includes a needle-shaped light spot irradiation part 10, a shifting light spot conversion part 30, a shifting light spot reception part 40, and an optical information acquisition part 48. In the optical information detection apparatus 50, a needle-shaped light spot L1 to be described later is generated, and a detection object S is irradiated with the needle-shaped light spot L1 in a such a manner that an optical axis (first optical axis) A1 of the needle-shaped light spot L1 is approximately parallel to a direction D3 (that is, a thickness direction of the detection object S) of the detection object S. In addition, in the optical information detection apparatus 50, emission light emitted from positions P1, P2, and P3, which are different from each other on the optical axis A1, inside an irradiation region R of the needle-shaped light spot L1 in the detection object S is converted into shifting light spot L2, and thus optical information of the positions P1, P2, and P3 from which the emission light is emitted is detected from the shifting light spot L2 that is received on a light-receiving plane P.

Furthermore, as positions different from each other on the optical axis A1 inside the irradiation region R in the detection object S, three points of the positions P1, P2, and P3 are exemplary examples in FIG. 1. However, the entirety of positions inside the irradiation region R correspond to detection positions of the optical information detection apparatus 50, and the number of the detection positions is not limited.

(Needle-Shaped Light Spot Irradiation Part)

The needle-shaped light spot irradiation part 10 has a configuration of generating the needle-shaped light spot L1 that is concentrated over a length dimension g greater than a width dimension w concentrated to planes in directions D1 and D2 orthogonal to the optical axis A1 along the optical axis A1, and irradiating the detection object S with the needle-shaped light spot L1.

The needle-shaped light spot L1 is not particularly limited as long as the needle-shaped light spot L1 is focused so that the length dimension g is greater than the width dimension w, and is non-diffracted light spot. As described above, in the non-diffracted light spot, strong light is reliably irradiated toward the irradiation region R, and the detection object S inside the irradiation region R is simultaneously excited. When the length dimension g of the needle-shaped light spot L1 is greater than the width dimension w, an effect that a plurality of pieces of optical information in a thickness direction of the detection object S can be collectively acquired is enhanced.

Furthermore, in a scanning laser microscope to be described later of the related art in which an optical modulation part 14 is not provided, the detection object S is irradiated with light spot focused without being subjected to optical modulation (hereinafter, referred to as typical light spot). In the typical light spot, a length dimension in the direction D3 corresponds to a spatial resolution of the direction D3 in the scanning laser microscope of the related art, and depends on a wavelength of light emitted from a light source and a numerical aperture of a focusing lens. For example, in a case where the length dimension g of the needle-shaped light spot L1 is larger than ten times the length dimension of the typical light spot in the direction D3, when using the microscope system 100 of this aspect, it is possible to measure three-dimensional information of the detection object S within a time that is approximately $\frac{1}{10}$ times in comparison to the scanning laser microscope of the related art. That is, two-dimensional scanning corresponding to ten points along the direction D3 is necessary to obtain three-dimensional information of the same thickness dimension as in the microscope system 100 of this aspect, which uses the needle-shaped light spot L1, by using the scanning laser microscope of the related art. Accordingly, the measurement time is taken by approximately ten times as long.

Examples of the needle-shaped light spot L1 include a Bessel beam. The Bessel beam is a beam of which a wave surface is given in a conical surface in which a propagation axis (that is, the optical axis A1) is set as a rotational symmetric axis, and in which a high-optical-intensity portion is generated in an axial shape along the propagation axis due to interference. An optical intensity distribution in a diameter direction (that is, the directions D1 and D2) of the beam is expressed by a square of an Bessel function as the name suggests. In this aspect, description will be given on the assumption that the needle-shaped light spot L1 is the Bessel beam.

The needle-shaped light spot irradiation part 10 includes a light source 12, the optical modulation part 14 that modulates light emitted from the light source to convert light (not shown) emitted from the light source 12 into the needle-shaped light spot L1, and a needle-shaped light spot generation part 16 that focuses the light modulated by the optical modulation part 14 to the detection object S and generates the needle-shaped light spot L1.

The light source 12 is not particularly limited, but it is preferable to have appropriate characteristics and specifications such as a wavelength, an optical intensity, and power so as to obtain light that is emitted in a direction opposite to that of the needle-shaped light spot L1 from the inside of the irradiation region R along an optical axis A2 when the detection object S is irradiated with the light emitted from the light source 12 as the needle-shaped light spot L1.

The optical modulation part 14 is configured to modulate an arbitrary physical amount such as an amplitude and a phase of the light that is emitted from the light source 12 and is reflected by a high reflection mirror 13, and to generate the needle-shaped light spot L1, which extends long in the optical axis A1 in parallel to a thickness direction of the detection object S, at least at the inside of the detection object S. Here, "at least at the inside of the detection object S" includes both a case where the needle-shaped light spot L1 is directly formed at the inside of the detection object S, and a case where the needle-shaped light spot L1 is formed at a position closer to the light source 12 in comparison to the detection object S in a direction along the optical axis A1 and the inside of the detection object S is irradiated with the needle-shaped light spot L1 in a non-diffraction manner.

As the optical modulation part 14, a spatial light modulator (SLM) capable of modulating an amplitude distribution or a phase distribution of spatial light is an exemplary example. Examples of the SLM include a spatial light phase modulator (liquid crystal on silicon (LCOS)-SLM) that performs the above-described modulation by using a liquid crystal, a digital micromirror device (DMD) by micro electro mechanical systems (MEMS) performing the above-described modulation by using a micro mirror, and the like. In this aspect, as the optical modulation part 14, a reflection type LCOS-SLM is used.

The needle-shaped light spot generation part 16 has a configuration of focusing the light modulated by the optical modulation part 14 to a predetermined region of the detection object S as the needle-shaped light spot L1. In this aspect, as the needle-shaped light spot generation part 16, an objective lens is used.

As an irradiation side optical system that causes light modulated by the optical modulation part 14 to propagate and irradiates the detection objection S with the light, focusing lenses 15, 18, 20, and 22 are sequentially disposed from a side close to the optical modulation part 14 along the optical axis A1 between the optical modulation part 14 and the needle-shaped light spot generation part 16. Furthermore, the focusing lens 22 is a compound lens. The respective focusing lenses 15, 18, 20, and 22 are appropriately disposed so that the optical modulation part 14 is disposed at a position, at which a pupil surface of an objective lens that constitutes the needle-shaped light spot generation part 16 is relayed, on the optical axis A1. High reflection mirrors 17, 19, and 21 folding optical path are disposed between the focusing lenses 15 and 18, between the focusing lenses 18 and 20, and between the focusing lenses 20 and 22.

The optical modulation part 14 includes a needle-shaped light spot setting part 120 that sets the length dimension g and the width dimension w of the needle-shaped light spot L1 that concentrates light to the inside of the detection object S to desired dimensions suitable for detection of optical information of the detection object S as will be described later. For example, the needle-shaped light spot setting part 120 is not particularly limited as long as the needle-shaped light spot setting part 120 calculates a modulation pattern of the optical modulation part 14 from information of light emitted from the light source 12 along the optical axis A1, and information of the desired needle-shaped light spot L1. As the needle-shaped light spot setting part 120, a computer equipped with a program that calculates the modulation pattern and the like is an exemplary example. According to the needle-shaped light spot setting part 120, the needle-shaped light spot L1 having the width dimension w and the length dimension g which are desired are set in correspondence with a measurement environment and the detection object S. In a needle-shaped spot having approximately the same width dimension w as a width dimension in a typical focused light spot, when the length dimension g that is ten or more times a length dimension of the typical focused light spot is obtained, speeding-up often times to the maximum is expected while maintaining spatial resolution of a plane direction (that is, a direction orthogonal to the direction D3) in three-dimensional imaging using a laser microscope of the related art. In addition, in the needle-shaped light spot setting part 120, the modulation pattern of the optical modulation part 14 is calculated in accordance with the degree of speeding-up (for example, ten times) that is attempted in the direction D3 as described above. In addition, in the needle-shaped light spot setting part 120, presence or absence of optical elements (for example, the focusing lenses 15, 18, 20, 22, and the like) between the optical modulation part 14 and the needle-shaped light spot generation part 16, and information of each of the optical elements are considered. In a case where an active optical element such as an SLM is used as the optical modulation part 14, the modulation pattern in the optical modulation part 14 can be rewritten in real time with information or a signal that is transmitted from the needle-shaped light spot setting part 120 to the optical modulation part 14, and the needle-shaped light spot L1 is set with high accuracy and in real time.

In addition, a beam splitter 23 is disposed on the optical axis A1 between the focusing lenses 15 and 18. Light emitted from the optical modulation part 14 is transmitted through the beam splitter 23, and is emitted onto the optical axis A1 toward the needle-shaped light spot generation part 16.

Figure 2:
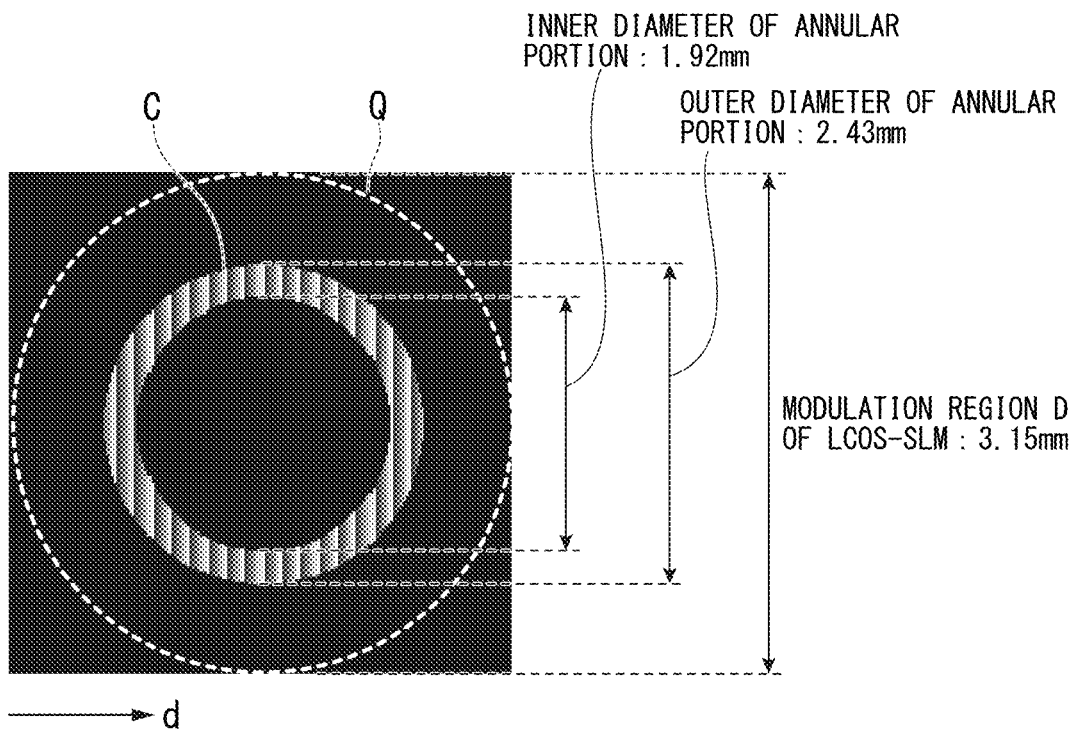
FIG. 2 is a schematic view showing an example of a phase modulation pattern in an optical modulation part of the optical information detection apparatus according to the aspect of the invention.

As shown in FIG. 1, to focus Bessel beam to a predetermined region of the detection object S as the needle-shaped light spot L1, in the LCOS-SLM as the optical modulation part 14, as shown in FIG. 2, only liquid crystal molecules in a portion corresponding to an annular portion C among a plurality of liquid crystal molecules arranged in a plane orthogonal to the optical axis A1 are set to a phase modulation amount (that is, an orientation direction): $\exp[ik \times \sin(\theta_d)]$ for inclining (tilting) an incident wave surface at a predetermined angle. In the phase modulation amount $\exp[ik \times \sin(\theta_d)]$, k represents a wave number ($=2\pi/$wavelength). Respective dimensions shown in FIG. 2 are dimensions in a case where a wavelength is set to 488 nm, and an angle $\theta_d$ is set to 0.2°.

When the liquid crystal molecules of the LCOS-SLM as the optical modulation part 14 are set as described above, a wave front (that is, a spatial distribution of a phase) of light reflected by the high reflection mirror 13 is modulated. When the wave front of light reflected by the high reflection mirror 13 is modulated as described above, light reflected from the LCOS-SLM has an annular optical intensity distribution in a pupil surface (not shown) of an objective lens as the needle-shaped light spot generation part 16. That is, light having the annular high-optical-intensity distribution is formed on the pupil surface of the objective lens. Furthermore, a broken line Q shown in FIG. 2 represents a relative size of the pupil plane of the objective lens in the same drawing.

When the difference between an inner diameter and an outer diameter of the annular portion C shown in FIG. 2 is reduced by the needle-shaped light spot setting part 120, a ratio of the length dimension g to the width dimension w is raised, and it is possible to enlarge the depth of focus of the Bessel beam as the needle-shaped light spot L1.

In the LCOS-SLM as the optical modulation part 14, liquid crystal molecules in a portion other than the portion corresponding to the annular portion C among the plurality of liquid crystal molecules arranged in a plane orthogonal to the optical axis A1 are not modulated by the signal transmitted from the needle-shaped light spot setting part 120.

Accordingly, 0-order light of light emitted to liquid crystal molecules in a portion other than the portion corresponding to the annular portion C are reflected from the optical modulation part 14. In this aspect, an aperture 31 is provided at a focal position (a so-called front side focal distance) of the focusing lens 15 on a side opposite to the optical modulation part 14. According to this, 0-order light which is a non-modulation component reflected from a portion of the optical modulation part 14 other than the annular portion C does not contribute to acquisition of the optical information of the detection object S. The 0-order light propagates after being transmitted through the focusing lens 15 and the high reflection mirror 17 as shown by two-dot broken line in FIG.

1, but the 0-order light is blocked by the aperture 31 and the detection object S is not irradiated with the 0-order light.

(Detection Object)

The detection object S is disposed on the optical axis A1 of the needle-shaped light spot L1 emitted from the needle-shaped light spot irradiation part 10. The detection object S includes a material or an element that is capable of being irradiated with the needle-shaped light spot L1 and is stimulated by the needle-shaped light spot L1 in the irradiation. For example, the detection object S may be a biological object or a non-biological object without particular limitation.

In the detection object S, from the material or the element that is irradiated with the needle-shaped light spot L1, an arbitrary optical response such as absorption or reflection of light, fluorescence, phosphorescence, or scattered light is made. In this aspect, scattered light, which is emitted along the optical axis A2 from the positions P1, P2, and P3 on the optical axis A1 inside the irradiation region R of the detection object S irradiated with the needle-shaped light spot L1, is set as a light-receiving target.

The microscope system 100 includes a stage T on which the detection object S is placed. The stage T is movable at least in a plane (that is, the directions D1 and D2) that is orthogonal to the optical axis A1 of the needle-shaped light spot L1.

(Shifting Light Spot Conversion Part)

The shifting light spot conversion part 30 has a configuration of converting emission light (not shown), which is emitted from the positions P1, P2, and P3 on the optical axis A1 inside the irradiation region R of the needle-shaped light spot L1 in the detection object S, into the shifting light spot L2. The shifting light spot L2 is light that shifts so that focusing positions Q1, Q2, and Q3 on a light-receiving plane M intersecting the optical axis A2 vary in correspondence with the positions P1, P2, and P3 in the detection object S in accordance with movement along the optical axis (second optical axis) A2 of the emission light.

The shifting light spot L2 is not particularly limited as long as the shifting light spot L2 is non-diffracted light spot that shifts so that the focusing positions Q1, Q2, and Q3 on the light-receiving plane M vary in correspondence with the positions P1, P2, and P3 from which the emission light is emitted in accordance with movement along the optical axis A2 of the emission light as described above. When the shifting light spot L2 is the non-diffracted light spot, the light-receiving plane M can be set at an arbitrary position on the optical axis A2, the focusing positions Q1, Q2, and Q3 of the shifting light spot L2 on the light-receiving plane M that is set can be made different from each other in a more reliable manner, and the shifting light spot can be received with high resolution. From the viewpoint of resolving information included in each of a plurality of beams of shifting light spot L2, a gap between the focusing positions Q1, Q2, and Q3 on the light-receiving plane M is set to be equal to or greater than a spot diameter of the shifting light spot L2 on the light-receiving plane M. In other words, in a thickness direction of the detection object S, with respect to a deviation of spatial resolution of the direction D3 in a laser scanning microscope of the related art, the gap between the focusing positions Q1, Q2, and Q3 is set to be equal to or greater than the spot diameter of the shifting light spot L2. In addition, it is preferable that the gap between the focusing positions Q1, Q2, and Q3 on the light-receiving plane M is equal to or greater than a minimum dimension at which the shifting light spot L2 focused to each of the focusing positions Q1, Q2, and Q3 can be individually detected by the shifting light spot reception part 40 to be described later, and more preferably integral times one pixel size of a two-dimensional detector of the shifting light spot reception part 40. When the gap between the focusing positions Q1, Q2, and Q3 on the light-receiving plane M is within the above-described range, information included in the shifting light spot L2 focused to each of the focusing positions Q1, Q2, and Q3 is resolved, and thus it is possible to further enhance an effect of collectively acquiring a plurality of pieces of optical information in the thickness direction of the detection object S with high accuracy.

As the shifting light spot L2, an Airy beam is an exemplary example. The Airy beam is a parabolic beam that is curved to draw a parabola with respect to the optical axis A2 in a free space. In this aspect, description will be given on the assumption that the shifting light spot L2 is the Airy beam.

The shifting light spot conversion part 30 includes an emission light modulation part 32 that convert emission light into shifting light spot through modulation of the emission light emitted from the position P1, P2, and P3 on the optical path A1 within the irradiation region R of the needle-shaped light spot L1.

As an example of the emission light modulation part 32, the SLM as same as the optical modulation part 14 and the like is an exemplary example. Examples of the SLM suitable for application to the emission light modulation part 32 include the LCOS-SLM and the DMD by the MEMS, and further include a membrane-type deformable mirror and the like. In this aspect, as the emission light modulation part 32, the reflection type LCOS-SLM is used.

The emission light modulation part 32 includes a shifting light spot setting part 130 that sets a shift amount and an intensity distribution of the shifting light spot L2 in the directions D1 and D3, and the focusing positions Q1, Q2, and Q3 to a desired amount, a desired distribution, and desired positions which are suitable for light-reception by the shifting light spot reception part 40. For example, the shifting light spot setting part 130 is not particularly limited as long as the shifting light spot setting part 130 is configured to calculate a modulation pattern of the emission light modulation part 32 from information, which is emitted from the detection object S along the optical axis A2, in the thickness direction, and information of the shifting light spot L2 that is desired. As the shifting light spot setting part 130, a computer equipped with a program that calculates the modulation pattern, and the like is an exemplary example. According to the shifting light spot setting part 130, the desired shifting light spot L2 is set in correspondence with a measurement environment, optical characteristics of the detection object S, specifications and performance of the two-dimensional detector of the shifting light spot reception part 40. For example, it is preferable that the gap between the focusing positions Q1, Q2, and Q3 on the light-receiving plane M is set to be equal to or greater than a spot diameter of the shifting light spot L2 on the light-receiving plane M and to be greater than two times the minimum dimension at which detection by the two-dimensional detector of the shifting light spot reception part 40 can be performed. In the shifting light spot setting part 130, presence or absence of optical elements (for example, the focusing lenses 18, 20, 22, 24, 25, and the like) between the needle-shaped light spot generation part 16 and the shifting light spot reception part 40, and information of each of the optical elements are considered. In a case where an active optical element such as the SLM is used as the emission light modulation part 32 as described above, the modulation pattern in the emission light modulation part 32 can be rewritten in real time with information or a signal that is transmitted from the shifting light spot setting part 130 to the emission light modulation part 32, and the shifting light spot L2 is set with high accuracy and in real time.

In this aspect, as shown in FIG. 1, scattered light, which is emitted in a direction (that is, a direction opposite to the direction D3) opposite to a propagation direction of the needle-shaped light spot L1, is received as emission light along the optical axis A2 from the positions P1, P2, and P3 on the optical axis A1 inside the irradiation region R of the needle-shaped light spot L1. Optical information related to the detection object S inside the irradiation region R is detected from the scattered light. The shifting light spot conversion part 30 shares the objective lens used in the needle-shaped light spot generation part 16, the focusing lenses 18, 20, and 22, and the high reflection mirrors 19 and 21 folding optical path with the needle-shaped light spot irradiation part 10 along the optical axis A2 from the irradiation region R of the needle-shaped light spot L1 to the beam splitter 23 as a detection side optical system for causing light emitted from the positions P1, P2, and P3 of the irradiation region R on the optical axis A1 in the detection object S to propagate toward the emission light modulation part 32.

The emission light passing through the focusing lens 18 along the optical axis A2 is incident to the beam splitter 23 from a side opposite to an incident plane of light emitted from the light source 12, and thus a part of the emission light is reflected from the beam splitter 23.

The focusing lens 24 is disposed between the beam splitter 23 and the emission light modulation part 32 along the optical axis A2 as a succession of the above-described detection side optical system. The high reflection mirrors 26 and 27 folding optical path are respectively disposed between the beam splitter 23 and the focusing lens 24, and between the focusing lens 24 and the emission light modulation part 32.

Figure 3:
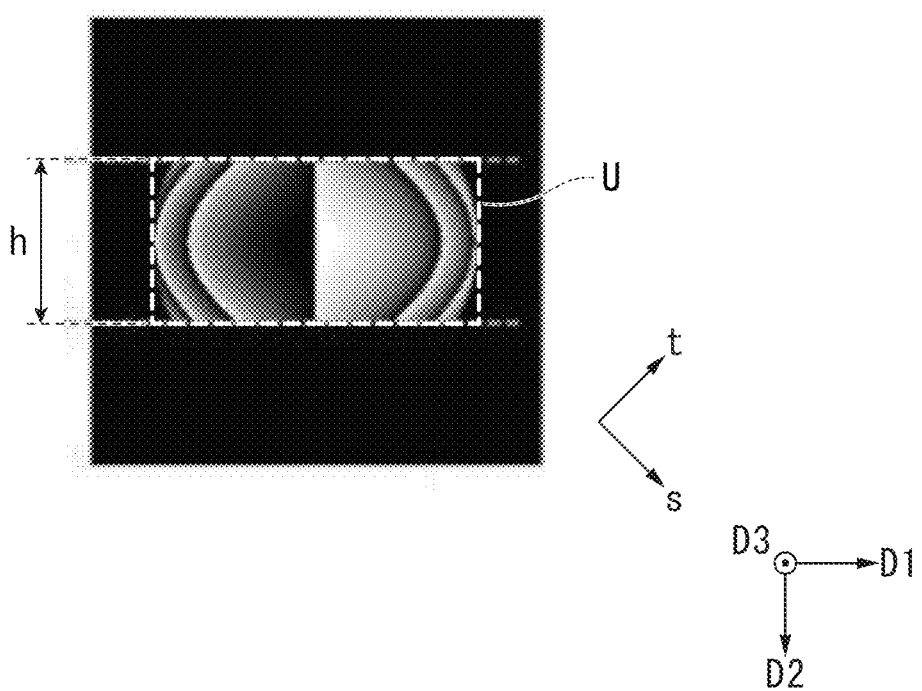
FIG. 3 is a schematic view showing an example of a phase modulation pattern in an emitted-light modulation part of the optical information detection apparatus according to the aspect of the invention.

As shown in FIG. 1, to focus the Airy beam to the light-receiving plane M as the shifting light spot L2, in the LCOS-SLM as the emission light modulation part 32, when a phase modulation amount of a plurality of liquid crystal molecules arranged at a predetermined angle with respect to the optical axis A2 is set by the shifting light spot setting part 130 on the basis of a known principle (for example, refer to Jia et. al., Nature Photon. 8, 302-306 (2014)), a wave front of the emission light emitted from the positions P1, P2, and P3 on the optical axis A1 is modulated. In a known method, as shown in FIG. 3, the phase modulation amount of individual liquid crystal molecules is controlled so that entire phase modulation amount of a plurality of liquid crystal molecules forms a wave front W (s, t) expressed by the following Expression (1).

[Mathematical Formula 1]

$$W(s, t) = \exp\left(ik\frac{s^3 + t^3}{R_{\mathit{eff}}^3} p\right) rect\left(\frac{t}{\sqrt{2}\, h}\right) \quad (1)$$

Furthermore, in Expression (1), $R_{\mathit{eff}}$ represents an effective radius of a phase modulation region of the LCOS-SLM, h represents an effective height of the phase modulation region of the LCOS-SLM, p represents a relative phase shift amount at a position of $R_{\mathit{eff}}$ with respect to the center of the phase modulation region of the LCOS-SLM, and k represents a wave number (=2π/wavelength). For example, when p is 3, the phase modulation amount at $R_{\mathit{eff}}$ with respect to the center of the phase modulation region of the LCOS-SLM is 6π-3λ.

For example, FIG. 3 schematically shows the phase modulation amount of the liquid crystal molecules in the LCOS-SLM in a case where p is set to 3 in Expression (1), and shows that a cubic functional phase distribution in which a top portion (that is, the central portion of a phase modulation region U shown in FIG. 3) is cut in a plane is formed.

A high reflection mirror 28 folding optical path and a focusing lens 25 are sequentially disposed between the emission light modulation part 32 and the light-receiving plane M along the optical axis A2 in order for the emission light of which a phase is modulated by the LCOS-SLM is formed on the light-receiving plane M as the shifting light spot L2. In the detection side optical system, an inter-lens distance of the focusing lenses 24 and 25 on the optical axis A2 is set to the sum of focal lengths of respective lenses.

Accordingly, light that is reflected from the LCOS-SLM is reflected from the high reflection mirror 28, is incident to the focusing lens 25, is focused by the focusing lens 25 as an Airy beam having a parabolic shape that is curved to draw a parabola with respect to the optical axis A2, and propagates in a non-diffraction manner. Airy beams based on a plurality of beams of emission light, which are respectively emitted from the positions P1, P2, and P3 different from each other on the optical axis A1, have approximately the same curved shape, and are distributed to deviate from each other in parallel to the optical axis A2.

(Shifting Light Spot Reception Part)

The shifting light spot reception part 40 has a configuration of receiving the shifting light spot L2 along the light-receiving plane M. Examples of the shifting light spot reception part 40 include an array light reception element such as a CCD and an image sensor.

(Optical Information Acquisition Part)

The optical information acquisition part 48 is provided to acquire information necessary for three-dimensional imaging of the detection object S from information of the shifting light spot L2 received by the shifting light spot reception part 40. Examples of the optical information acquisition part 48 include a computer.

Details of a corresponding relationship between arrangement information (pixel number and the like) of light reception elements on the light-receiving plane of the shifting light spot reception part 40, and the positions P1, P2, and P3 on the optical path A1 inside the irradiation region R of the detection object S, specific processing contents (for example, use of color information, or display for emphasizing a specific material) related to information transmitted from the shifting light spot reception part 40, and the like are stored in the optical information acquisition part 48 in advance. In addition, the optical information acquisition part 48 is provided with functions of noise removal processing with respect to information transmitted from the shifting light spot reception part 40, filtering processing for effectively visualizing desired information, and the like.

(Image Information Creation Part)

The image information creation part 60 has a configuration of creating image information such as three-dimensional image information from information related to the detection object S which is acquired by the optical information acquisition part 48, and displaying the image information on a monitor 62. Furthermore, the image information creation part 60 may be embedded in a computer that constitutes the optical information acquisition part 48. According to this, information of the shifting light spot L2 received by the shifting light spot reception part 40 can be instantly displayed on the monitor and the like to be visualized.

According to the above-described optical information detection apparatus 50, the detection object S is irradiated with the non-diffracted needle-shaped light spot L1 that is focused to extend in the length dimension g in comparison to the width dimension w on the optical axis A1, stimulation is simultaneously applied over the length dimension g of the needle-shaped light spot L1 with respect to the depth direction (that is, the thickness direction of the detection object S) along the optical axis A1 of the detection object S. In addition, emission light emitted from the positions P1, P2, and P3, which are different from each other, inside the irradiation region R of the needle-shaped light spot L1 in the detection object S is converted into non-diffracted shifting light spot L2. The shifting light spot L2 is light that shifts so that the focusing positions Q1, Q2, and Q3 on the light-receiving plane M vary in correspondence with the positions P1, P2, and P3 of the detection object S from which emission light is emitted in accordance with movement along the optical axis A2. When the emission light is converted into the shifting light spot L2, it is possible to convert information in the thickness direction of the detection object S into in-plane information of the light-receiving plane M. According to this, when performing irradiation with the needle-shaped light spot L1 once, it is possible to instantly acquire and detect information of positions different from each other in the thickness direction of the detection object S at the velocity of light without necessity for mechanical scanning, and movement and control of an apparatus. In addition, when being combined with a known technology in which scanning of the detection object S with irradiation light is performed at a high speed in a plane orthogonal to the optical axis A1, it is possible to acquire three-dimensional information of the detection object S through two-dimensional scanning performed once at a relatively high speed.

In addition, according to the optical information detection apparatus 50, since the needle-shaped light spot irradiation part 10 is provided with the optical modulation part 14 and the needle-shaped light spot generation part 16, light emitted from the light source 12 can be freely and smoothly modulated by the optical modulation part 14 in which a modulation pattern and the like are designed and calculated in advance, the modulated light can be focused to the detection object S by the needle-shaped light spot generation part 16, and the needle-shaped light spot L1 can be generated.

In this aspect, since the LCOS-SLM that is an active element is used as the optical modulation part 14, it is easy to freely set and change the phase modulation amount of the liquid crystal molecules in correspondence with a wave front and characteristics of light emitted from the light source 12, and the length dimension g of the needle-shaped light spot L1, and the degree of freedom of design of the entirety of the optical information detection apparatus 50 is raised. In addition, it is not necessary to replace the optical modulation part 14 whenever a modulation pattern with respect to light emitted from the light source 12 is different.

In addition, according to the optical information detection apparatus 50, since the Bessel beam is used as the needle-shaped light spot L1, an optical intensity distribution in the directions D1 and D2 orthogonal to the optical axis A1 is expressed by square of a Bessel function. Accordingly, the detection object S can be irradiated with irradiation light in which a high-optical-intensity portion is formed in the width dimension w in a non-diffraction manner, and it is possible to more reliably apply stimulation with respect to a predetermined region of the detection object S.

In addition, according to the optical information detection apparatus 50, since the shifting light spot conversion part 30 is provided with the emission light modulation part 32, the emission light emitted from the positions P1, P2, and P3, which are different from each other, inside the irradiation region R in the detection object S can be freely and smoothly modulated by the emission light modulation part 32 in which a modulation pattern and the like are designed and calculated in advance, and the shifting light spot L2 can be generated.

In this aspect, as same as in the optical modulation part 14, since the LCOS-SLM that is an active element is used as the emission light modulation part 32, it is easy to freely set and change the phase modulation amount of the liquid crystal molecules in correspondence with a wave front and characteristics of emission light emitted from the positions P1, P2, and P3, which are different from each other, inside the irradiation region R in the detection object S, a minimum dimension capable of being detected in the shifting light spot reception part 40, and the like, and the degree of freedom of design of the entirety of the optical information detection apparatus 50 is raised. In addition, it is not necessary to replace the emission light modulation part 32 whenever a modulation pattern is different in correspondence with the emission light emitted from the detection object S or specifications of the shifting light spot reception part 40.

In addition, according to the optical information detection apparatus 50, since the airy Airy beam is used as the shifting light spot L2, emission light from the positions P1, P2, and P3, which are different from each other, inside the irradiation region R in the detection object S can be set to a parabolic beam that is curved to draw a parabola with respect to the optical axis A2, and can be distributed to deviate along the optical axis A2 for each of the positions P1, P2, and P3 different from each other. According to this, a plurality of beams of shifting light spot are cut out on the light-receiving plane M intersecting the optical axis A2, and individual beams of the shifting light spot are more reliably received. As a result, it is possible to detect optical information of the positions P1, P2, and P3, which are different from each other, inside the irradiation region R in the detection object S with accuracy.

In addition, according to the microscope system 100, since the above-described optical information detection apparatus 50, and the image information creation part 60 are provided, when performing irradiation with the needle-shaped light spot L1 once, it is possible to acquire three-dimensional information of the detection object S at a relatively high speed on the basis of optical information, which is detected by the optical information detection apparatus 50, of the positions P1, P2, and P3 different from each other inside the irradiation region R in the detection object without necessity for mechanical scanning or movement and control of an apparatus, and it is possible to perform three-dimensional optical imaging.

Hereinbefore, a preferred embodiment of the invention has been described in detail. However, the invention is not limited to the specific embodiment, and various modifications and changes can be made in a range of the gist of the invention described in the appended claims.

Figure 4:
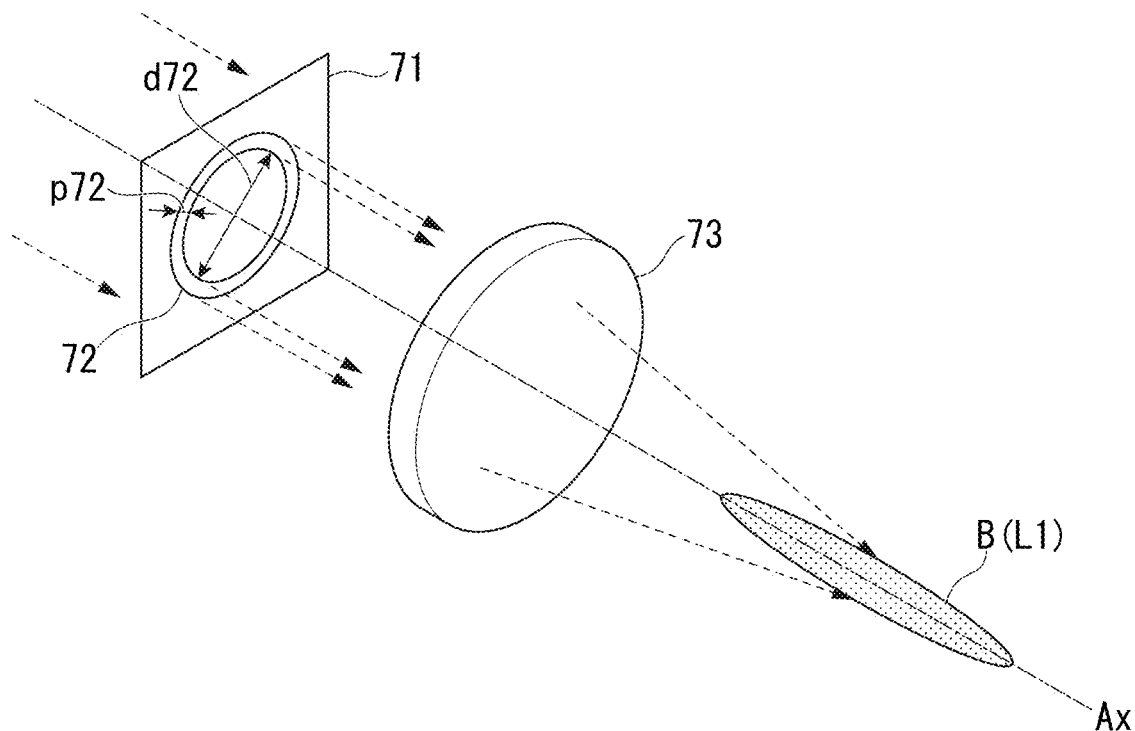
FIG. 4 is a schematic view showing a needle-shaped light spot forming method applicable to the optical information detection apparatus according to the aspect of the invention.

In addition, in the above-described aspect, a configuration of generating a Bessel beam as the needle-shaped light spot L1 by using the LCOS-SLM is an exemplary example, but several methods of generating the Bessel beam are known in addition to the method. For example, as shown in FIG. 4, when parallel light from a light source and the like passes through an amplitude mask 71 in which an annular opening 72 is formed, and the light that has passed through the amplitude mask 71 is focused by a lens 73, a Bessel beam B, which is focused over a length dimension greater than a width dimension focused in a direction orthogonal to an optical axis Ax along the optical axis Ax, is generated. According to this method, it is possible to control the length dimension to the width dimension of the needle-shaped light spot L1 by changing a diameter d72 or a width p72 of the opening 72.

Figure 5:
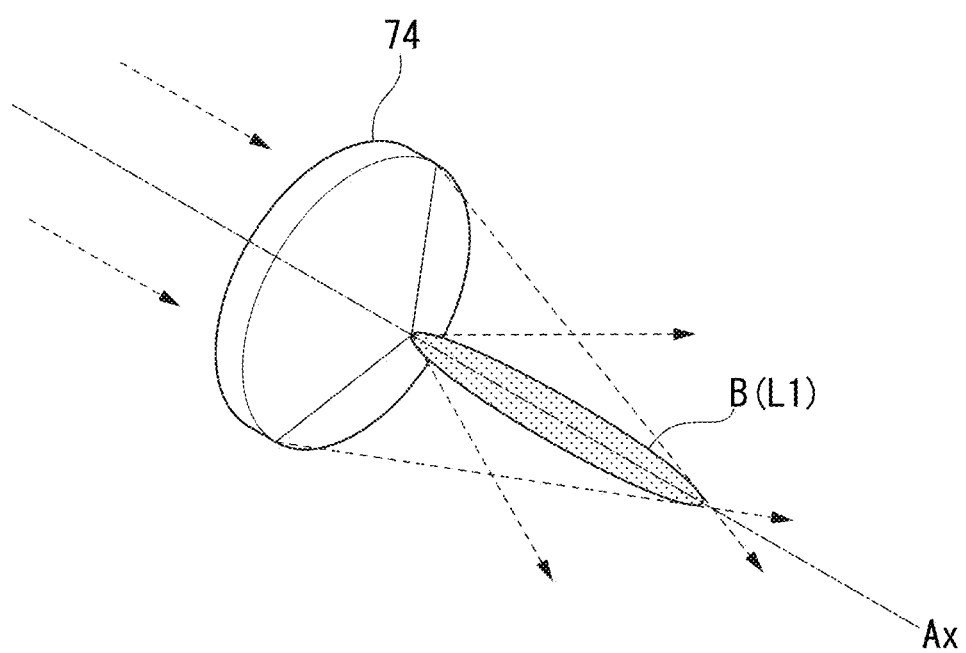
FIG. 5 is a schematic view showing another needle-shaped light spot forming method applicable to the optical information detection apparatus according to the aspect of the invention.

As another method of generating the Bessel beam, for example, as shown in FIG. 5, the Bessel beam B is also generated by focusing parallel light from a light source and the like by using an Axicon lens 74 in which an emission side is formed in a conical shape. The Bessel beam B generated in this manner may be used as the needle-shaped light spot L1.

In addition, when using the Bessel beam as the needle-shaped light spot L1, as described above, the high-optical-intensity portion is formed in the width dimension w in the directions D1 and D2 orthogonal to the optical axis A1, weak light occurs as a side lobe on an outer side of the high-optical-intensity portion in the same directions. When the weak light is received in a state of overlapping the emission light from the positions P1, P2, and P3 of the detection object S to be originally detected on the light-receiving plane M, a signal-to-noise ratio (S/N ratio) decreases, and information in which optical information of the positions P1, P2, and P3, and information of the weak light are combined is apt to be detected. From the viewpoint of suppressing the decrease of the S/N ratio, in the optical information detection apparatus 50 and the microscope system 100, introduction of a configuration of a known multi-photon excitation microscope is appropriate. When the configuration of the multi-photon excitation microscope is introduced, in a case of n-photon excitation (n is a positive integer), optical intensity of emission light is changed in proportional to n-th power of an excitation optical intensity distribution, and thus an influence of the weak light becomes relatively weak. According to this, the weak light on the light-receiving plane M becomes weak to a certain extent at which the weak light is not substantially detected, and thus it is possible to detect optical information of the positions P1, P2, and P3 of the detection object S to be originally detected with higher accuracy.

In addition, in the above-described aspect, description has been of a configuration in which the stage T on which the detection object S is placed is movable in a plane orthogonal to the optical axis A1 of the needle-shaped light spot L1 as an example. However, when moving the needle-shaped light spot L1 in a plane orthogonal to the optical axis Ax with respect to the detection object S, the needle-shaped light spot L1 may be moved relatively to the detection object S. Accordingly, the position of the detection object S and the stage T may be fixed, and scanning with the needle-shaped light spot L1 may be performed in a plane orthogonal to the optical axis A1 with respect to the detection object S by using a galvanometer mirror, and the like.

That is, the microscope system 100 may be beam scanning laser microscope capable of performing scanning with the needle-shaped light spot L1 in a plane orthogonal to the optical axis A1.

In addition, in the above-described aspect, description has been given by employing the Airy beam as the shifting light spot. However, the shifting light spot may be non-diffracted light light spot that shifts so that the focusing positions Q1, Q2, and Q3 on the light-receiving plane M vary in correspondence with the positions P1, P2, and P3 from which emission light is emitted in accordance with movement along the optical axis A2. For example, the shifting light spot may not be curved with respect to the optical axis A2, a distance from the optical axis A2 may linearly vary in accordance with movement along the optical axis A2, and the focusing positions Q1, Q2, or Q3, at which the shifting light spot is focused, may be different from each other for each of the positions P1, P2, and P3 from which emission light is emitted. That is, the shifting light spot may be a light spot that is inclined with respect to the optical axis A2, and extends parallel to each other for each of the positions P1, P2, and P3 from which emission light is emitted.

In addition, in the above-described aspect, as the optical modulation part 14 and the emission light modulation part 32, the LCOS-SLM is used. However, an optical wave incident to each modulation part may be set as an input side optical wave, an optical wave output from the modulation part may be set as output light, a modulation amount in the modulation part may be appropriately calculated from a relationship between the input wave and the output wave, may be set in advance, or may be appropriately corrected. In addition, an optical wave incident to the modulation part may be set as object light, appropriate reference light may be set, an interference fringe may be calculated to emit the optical wave output from the modulation part, and a computer generated hologram (CGH) may be applied to the optical modulation part 14 and the emission light modulation part 32.

In addition, the microscope system 100 can approximately simultaneously acquire a plurality of pieces of optical information of the positions P1, P2, and P3 different from each other in a direction along the optical axis A1 in the detection object S, the microscope system 100 can be introduced to a known multi-point scanning laser microscope. Due to introduction of the known multi-point scanning laser microscope, it is possible to approximately simultaneously acquire a plurality of pieces of optical information of positions different from each other in a plane orthogonal to the optical axis A1, and thus acquisition of the three-dimensional information of the detection object S and three-dimensional imaging become possible in an approximately instant manner.

In addition, in the above-described microscope system 100, when introducing a dispersion element or a configuration capable of separating a plurality of beams of emission light for every wavelength in a direction that intersects the optical axis A2 and is different from a direction in which focusing positions deviate from each other in accordance with positions on the optical axis A1 in the detection side optical system, detection of optical information for every spectrum of the emission light, spectrum imaging, and multi-color imaging become possible. Accordingly, when a biological sample such as cells is set as the detection object S, if a plurality of detection dyes are applied to the detection object S, the inside of the irradiation region R is simultaneously excited by the needle-shaped light spot L1, and spectrum imaging is performed as described above, it is possible to observe a local aspect of an organ, a function, and a specific portion inside the cells.

In addition, in the optical information detection apparatus 50 and the microscope system 100, description has been given of an example in which in the detection object S, scattered light is emitted from a material or an element that is irradiated with the needle-shaped light spot L1. However, as described above, an optical response from the detection object S may be fluorescence including one-photon excitation and multi-photon excitation, Raman scattering light, non-linear light-emission such as a second harmonic wave, absorption or reflection of light, phosphorescence, and the like as long as detection is possible in addition to the fluorescence. The arrangement or the number of the focusing lenses, the high reflection mirrors folding optical path, and the beam splitter which are used in the irradiation side optical system and the detection side optical system can be appropriately changed in conformity to the optical responses.

In addition, in the optical information detection apparatus 50 and the microscope system 100, when the detection object S is irradiated with the needle-shaped light spot L1, light emitted in a direction opposite to the needle-shaped light spot L1 along the optical axis A2 from the inside of the irradiation region R is set as a detection target, but light emitted in the same direction as that of the needle-shaped light spot L1 along the optical axis A2 from the inside of the irradiation region R may be set as the detection target. That is, the optical information detection apparatus and the microscope system according to the invention may have a transmission type configuration in which the detection side optical system is disposed on a side opposite to the irradiation side optical system with the detection object S set as a reference without limitation to the reflection type configuration shown in FIG. 1.

Next, a description will be given of examples of the optical information detection apparatus 50 and the microscope system 100 of this aspect. Furthermore, the invention is not limited to the following examples.

Example 1

The optical information detection apparatus 50 shown in FIG. 1 was constructed, and verification with respect to detection of optical information in the thickness direction of the detection object S inside the irradiation region R of the needle-shaped light spot L1 was performed. However, the optical information acquisition part 48 was omitted, and an output of a CCD used as the shifting light spot reception part 40 was confirmed, and verification of the optical information was performed.

In addition, as the stage T, a piezo-drive type three-dimensional accurate movable stage was used.

Overviews of optical components used in the microscope system 100 are shown in Table 1

TABLE 1

| Name of constituent element | Design condition, model number, and the like |
|---|---|
| Light source 12 | Wavelength; 488 nm, continuous wave oscillation · parallel light |
| Optical modulation part 14 | LCOS-SLM: X10468-01 (manufactured and distributed by Hamamatsu Photonics K. K.) |
| Beam splitter 23 | Transmittance:reflectance = 50:50 |
| Focusing lens 15 | Focal length; 250 mm |
| Focusing lens 18 | Focal length; 200 mm |

TABLE 1-continued

| Name of constituent element | Design condition, model number, and the like |
|---|---|
| Focusing lens 20 | Focal length; 100 mm |
| Focusing lens 22 | Focal length; 200 mm |
| Needle-shaped light spot generation part 16 (objective lens) | Focal length; 1.8 mm, numerical aperture; 1.4 Oil-immersed lens |
| Focusing lens 24 | Focal length; 300 mm |
| Emission light modulation part 32 | LCOS-SLM: X10468-07 (manufactured and distributed by Hamamatsu Photonics K. K.) |
| Focusing lens 25 | Focal length; 150 mm |
| Shifting light spot reception part 40 | CCD: DMK51BU02. WG (manufactured and distributed by ARGO Corporation) |

Figure 6:
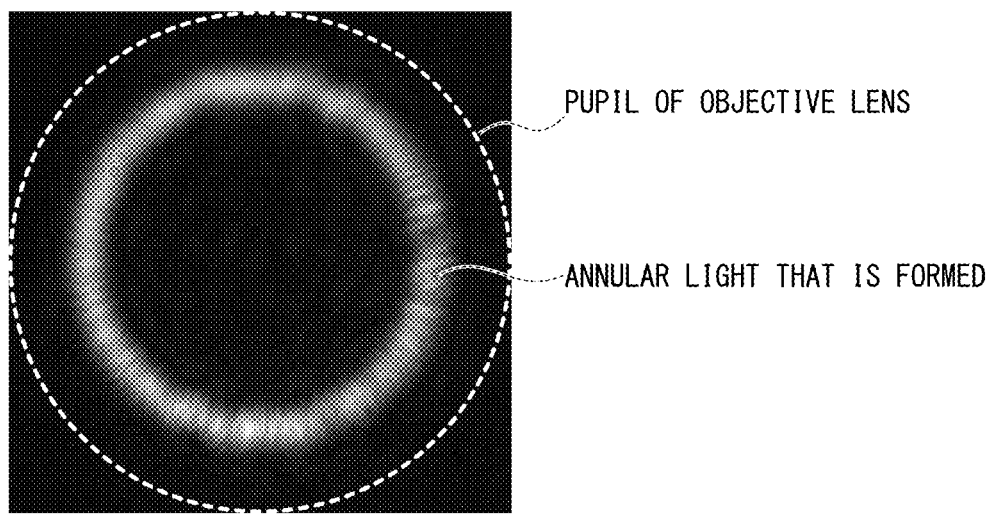
FIG. 6 is an image showing a result obtained by measuring an intensity distribution of light (annular light) formed by a needle-shaped light spot irradiation part of the optical information detection apparatus at a pupil position of an objective lens in Example 1.

In the optical information detection apparatus 50 constructed as described above, laser light that is a linearly polarized Gaussian beam was emitted from the light source 12, and the laser light was modulated with the LCOS-SLM that is the optical modulation part 14. In the modulation, a phase modulation amount (that is, an orientation direction) was set so that an incident wave surface of liquid crystal molecules in a portion corresponding to the annular portion C shown in FIG. 2 was inclined by 0.2°, thereby forming light (annular light) having an annular high-optical-intensity distribution as shown in FIG. 6 in a pupil plane (not shown) of an objective lens of the needle-shaped light spot generation part 16. A broken line in FIG. 6 relatively shows the size of the pupil of the objective lens of the needle-shaped light spot generation part 16 for reference. Specifically, light having an annular high-optical-intensity distribution, of which an inner diameter was 0.66 times and an outer diameter was 0.77 times with respect to an objective lens having a pupil diameter of 5.04 mm, was formed.

Figure 7:
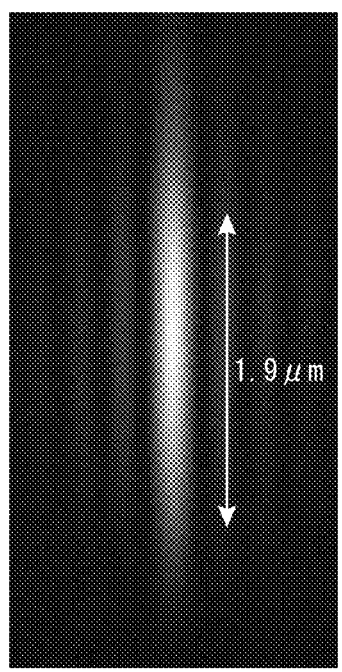
FIG. 7 is an image showing a result obtained by measuring an intensity distribution of needle-shaped light spot formed by the needle-shaped light spot irradiation part of the optical information detection apparatus in Example 1.

The annular light shown in FIG. 6 was focused to an objective lens, and needle-shaped light spot L1 having a width dimension w of 0.18 μm and a length dimension g of 1.9 μm as shown in FIG. 7 was generated.

The detection object S was set to gold nanoparticles having an average particle size of 100 nm. The gold nanoparticles were sprayed onto cover glass and were embedded in an immersion oil to prepare a prepared slide, and the prepared slide was mounted on the stage T. At this time, the stage T was accurately moved in a three-dimensional manner so that the gold nanoparticles isolated on the cover glass were positioned in the irradiation range R, which was formed at a focus of the objective lens, of the needle-shaped light spot L1.

When the gold nanoparticles are irradiated with the needle-shaped light spot L1 shown in FIG. 7, scattered light is emitted from the gold nanoparticles, and the scattered light (that is, emission light) propagates from the objective lens of the needle-shaped light spot generation part 16 along the optical axis A2. Scattered light having approximately half power is reflected from the beam splitter 23, and further propagates to the detection side optical system.

The scattered light reflected from the beam splitter 23 was modulated with the LCOS-SLM that is the emission light modulation part 32. In the modulation, a phase modulation amount of individual liquid crystal molecules was controlled so that entire wave fronts of a plurality of the liquid crystal molecules in the LCOS-SLM form the wave front W(s, t) expressed by Expression (1). In Expression (1), p was set to 3, $R_{eff}$ was set to 1.89 mm, h was set to 1.89 mm, and $k=(2\pi/\lambda)$ was set to $(2\pi/488 \text{ nm})$.

Figure 8:
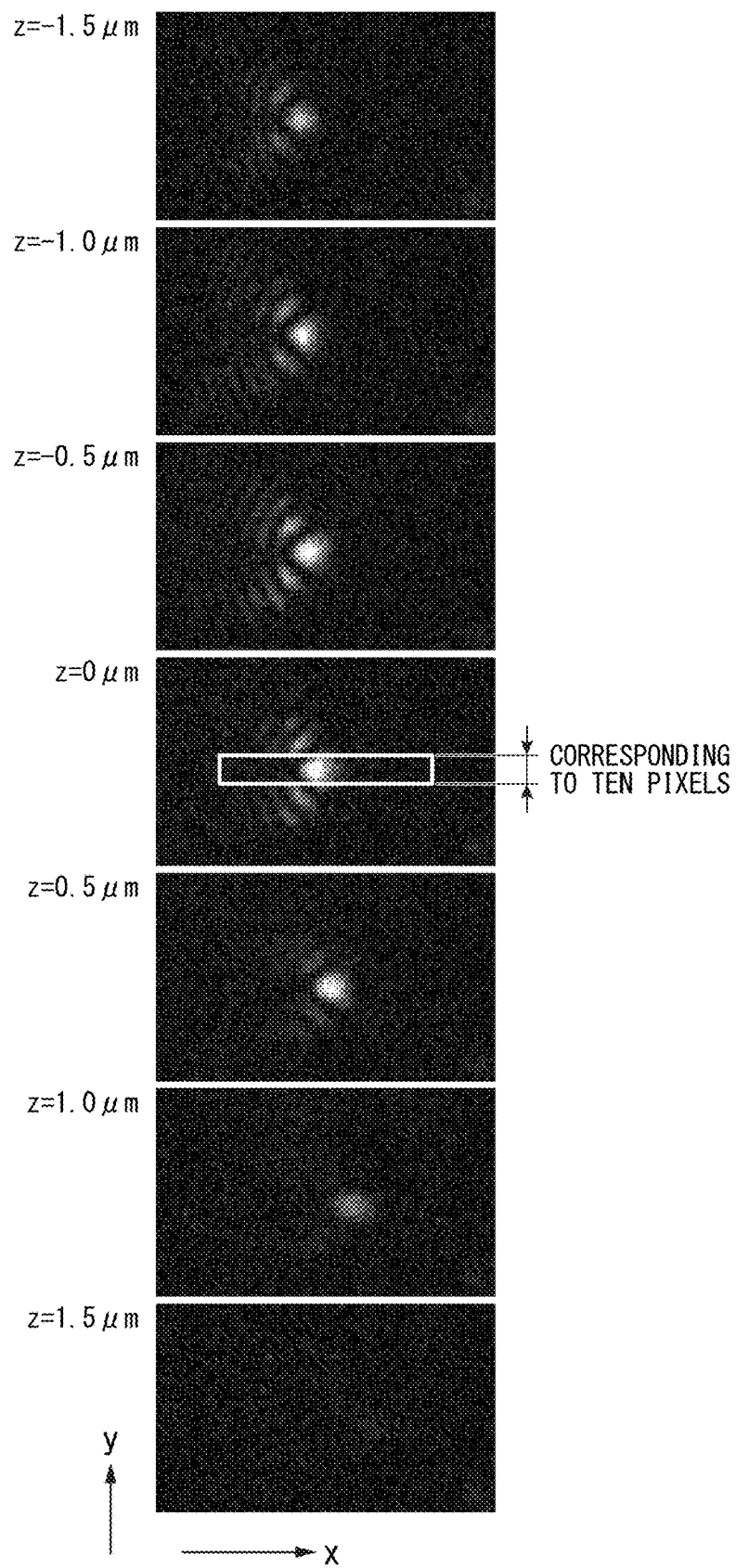
FIG. 8 is an image showing a result obtained by measuring two-dimensional intensity distributions of scattered light from individual metal microparticles while changing a position z in Example 1.

In the optical information detection apparatus 50 having the above-described arrangement and setting, the gold nanoparticles were accurately moved on the optical axis A1 inside the irradiation region R of the needle-shaped light spot L1 at an interval of 0.5 μm, and a two-dimensional intensity distribution of the scattered light on the CCD as the shifting light spot reception part 40 was recorded for every movement. Measurement results of the two-dimensional intensity distribution of the scattered light are shown in FIG. 8. In FIG. 8, a position z represents a distance on the optical axis A1 with the center of the length dimension of 1.9 μm of the needle-shaped light spot L1 set as a reference. That is, in FIG. 8, z=0 represents the center of the length dimension of 1.9 μm of the needle-shaped light spot L1. In addition, with regard to two-dimensional intensity distributions of the scattered light as shown FIG. 8, with respect to an x-direction that passes through a position of the highest optical intensity, intensity profiles obtained by integrating intensity corresponding to ten pixels of the CCD in a y-direction orthogonal to the x-direction at the position are shown in FIG. 9.

Figure 9:
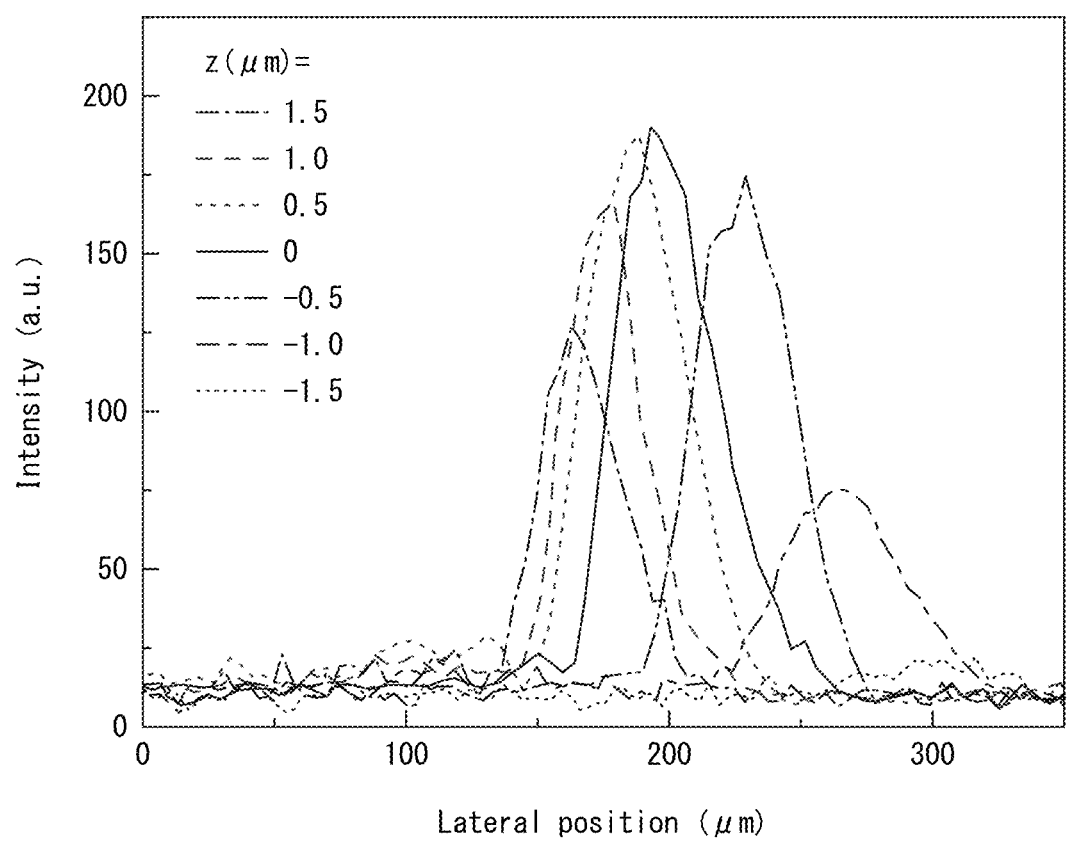
FIG. 9 is a graph showing an intensity profile obtained by performing integration with respect to each of the two-dimensional intensity distributions of the scattered light as shown in FIG. 8 by ten pixels of a CCD in a y direction orthogonal to an x direction, which passes through a position with the highest optical intensity, at the position with respect to the x direction.

From experiment results shown in FIG. 8 and FIG. 9, it was confirmed that scattered-light signals from positions z different from each other at the focal position (that is, the irradiation region R of the needle-shaped light spot L1) of the objective lens were focused at in-plane positions different from each other on the light-receiving plane of the CCD. That is, with respect to light-emission of the detection object S due to irradiation with the needle-shaped light spot L1, it could be understood that information in a direction along the optical axes A1 and A2 can be converted into information in an in-plane direction orthogonal to the optical axis A2 due to self-curved characteristics of Airy beams.

From the results of the example, according to the optical information detection apparatus 50, it was verified that it is possible to realize a new optical information detection apparatus using simultaneous excitation in a direction along the optical axis A1 inside the irradiation region R with the needle-shaped light spot L1, and conversion from a direction along the optical axis A1 onto the light-receiving plane M intersecting the direction through conversion of optical signals due to optical responses emitted from the excited irradiation region R into shifting light spot. Accordingly, it can be said that it is also possible to realize three-dimensional high-speed optical imaging by combining the image information creation part 60 and the like to the optical information detection apparatus 50.

Example 2

Figure 10:
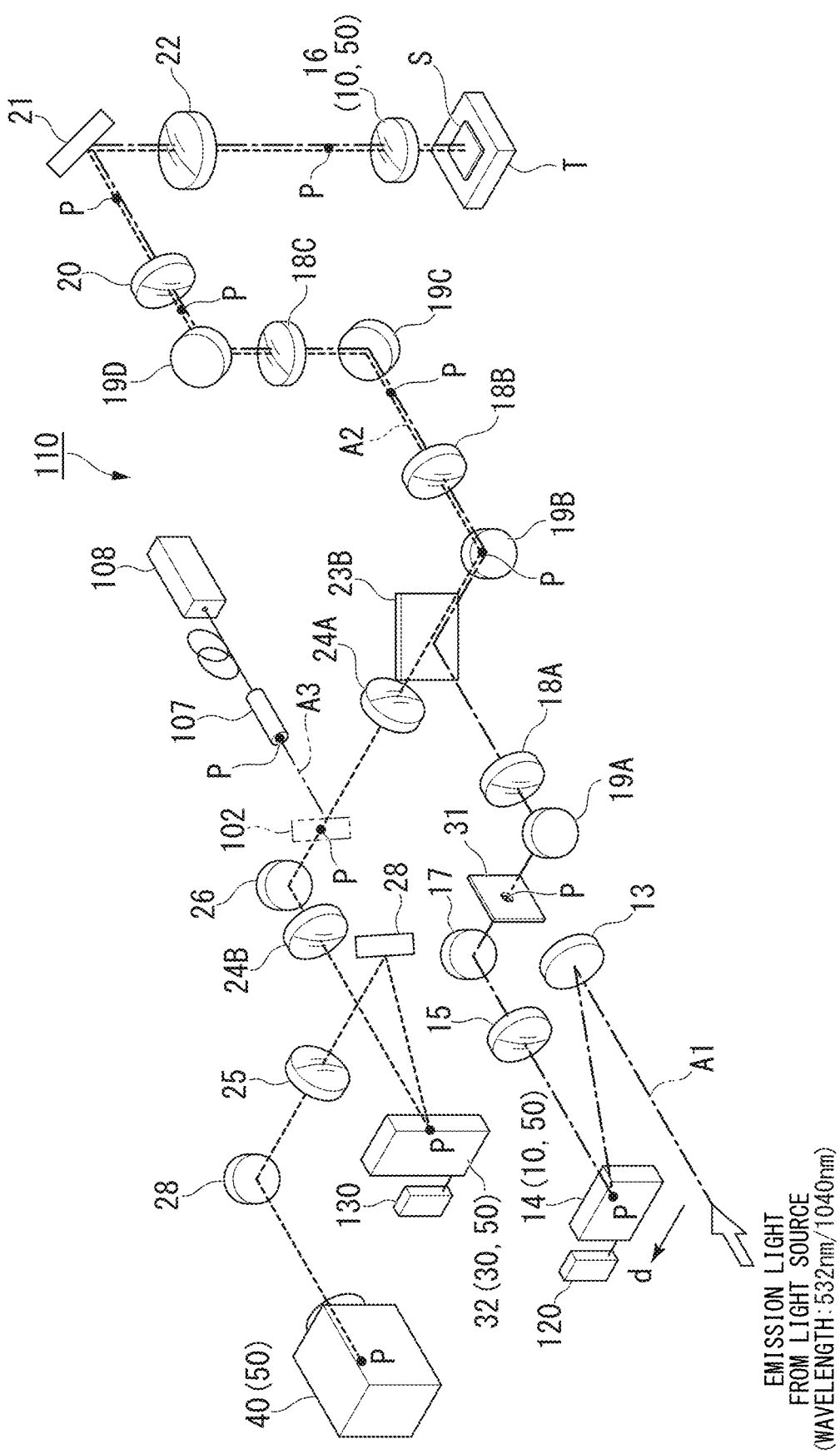
FIG. 10 is a schematic view of an optical information detection apparatus for fluorescent imaging in Example 2.

Next, a microscope system 110 shown in FIG. 10 was constructed, and an application to fluorescent imaging by the optical information detection apparatus and the microscope system according to the invention was verified. In constituent elements of the microscope system 110 shown in FIG. 10, a common reference numerals was given to a constituent element common to the constituent element of the microscope system 100 shown in FIG. 1, and a description thereof will be omitted.

In the microscope system 110, excitation light for generating fluorescence was set to needle-shaped light spot. Laser light having a wavelength of 532 nm was used for one-photon excitation, and laser light having a wavelength of 1040 nm was used for two-photon excitation. The laser light having the wavelength of 1040 nm for two-photon excitation was used to confirm formation of the needle-shaped light spot. The stage T is a piezo-drive stage, and was configured to three-dimensionally move with accuracy. A plurality of focusing lenses 15, 18A, 18B, 18C, 20, 22, 24A, 24B, and 25 were provided to construct a 4f optical system (4f Fourier-conversion optical system) in which a position P conforming to a focal length and the like of each of the focusing lenses was set as a position of an object surface and a position of an image surface at both sides of the lens on optical axes A1/A2/A3 on which the respective focusing lenses are respectively arranged. A pinhole for removing an interference fringe due to waste matter in the air, contamination or damage of a lens surface, and the like was disposed at a plurality of the positions P as necessary. The plurality of focusing lenses 15, 18A, 18B, 18C, 20, 22, 24A, 24B, and 25 are combination lenses. An Airy beam converted from emission light in FIG. 10 was detected by using the shifting light spot reception part 40. As the shifting light spot reception part 40, an electron-multiplying charge coupled device (EMCCD) capable of capturing an image at a high speed even in ultraweak light. In addition, a splitting mirror 102 was disposed to be freely inserted and extracted with respect to the optical axis A2 between a dichroic mirror 23B and an emission light modulation part 32. In a case where the splitting mirror 102 was inserted in the optical axis A2, an optical axis on a forward side in a light emission direction in comparison to the splitting mirror 102 is switched into the optical axis A3 indicated by a broken line. In addition, the splitting mirror 102 is inserted in the optical axis A2, fluorescence from a fluorescent bead is taken out to the optical axis A3 before being converted into an Airy beam, optical intensity (optical intensity that does not depend on information in a z-direction) of florescence emitted from the florescent bead is measured in a confocal detector 108. The confocal detector 108 includes a fiber-type light-receiving terminal 107, and a light-reception side end surface of the fiber-type light-receiving terminal 107 is disposed at a position P of an image surface of the focusing lens 24A on the optical axis A3. In addition, a lens pair is disposed between the splitting mirror 102 and the fiber-type light-reception terminal 107, but the lens pair is not shown. Light at a position P (that is, the same position P as an insertion position of the splitting mirror 102) behind the focusing lens 24A is focused on the light-reception side end surface of the fiber-type light-reception terminal 107 by the lens pair. The diameter of a core of the light-reception side end surface of the fiber-type light-reception terminal 107 was set to 1 mm.

Overviews of optical components used in the microscope system 110 are shown in Table 2.

TABLE 2

| Name of constituent element | Design condition, model number, and the like |
|---|---|
| Light source (not illustrated) | 532 nm/laser source: (continuous wave oscillation) 1040 nm/laser source: (repetition frequency: 10 MHz, pulse width: 200 fs) |
| Optical modulation part 14 | LCOS-SLM: SLM-100 (manufactured and distributed by SANTEC CORPORATION) |
| Dichroic mirror 23B | Transmission range (for 532 nm light source): 550 nm to 600 nm, reflection range: 531 nm to 534 nm Transmission range (for 1040 nm light source): 450 nm to 850 nm, reflection range: 1000 nm to 1100 nm |
| Focusing lens 15 | Focal length; 150 mm |
| Focusing lens 18A | Focal length; 150 mm |
| Focusing lens 18B | Focal length; 75 mm |

TABLE 2-continued

| Name of constituent element | Design condition, model number, and the like |
|---|---|
| Focusing lens 20 | Focal length; 150 mm |
| Focusing lens 22 | Focal length; 200 mm |
| Needle-shaped light spot generation part 16 (objective lens) | Magnification; 40 times, numerical aperture; 1.15 (water immersion) (manufactured and distributed by Nikon Corporation) |
| Focusing lens 24A | Focal length; 75 mm |
| Focusing lens 24B | Focal length; 150 mm |
| Emission light modulation part 32 | LCOS-SLM: X10468-01 (manufactured and distributed by Hamamatsu Photonics K. K.) |
| Focusing lens 25 | Focal length; 250 mm |
| Shifting light spot reception part 40 | EMCCD: iXon Ultra 897 (manufactured and distributed by Andor Technology) |
| Confocal detector 108 | R10467U-40 (manufactured and distributed by Hamamatsu Photonics K. K.) |

Figure 11:
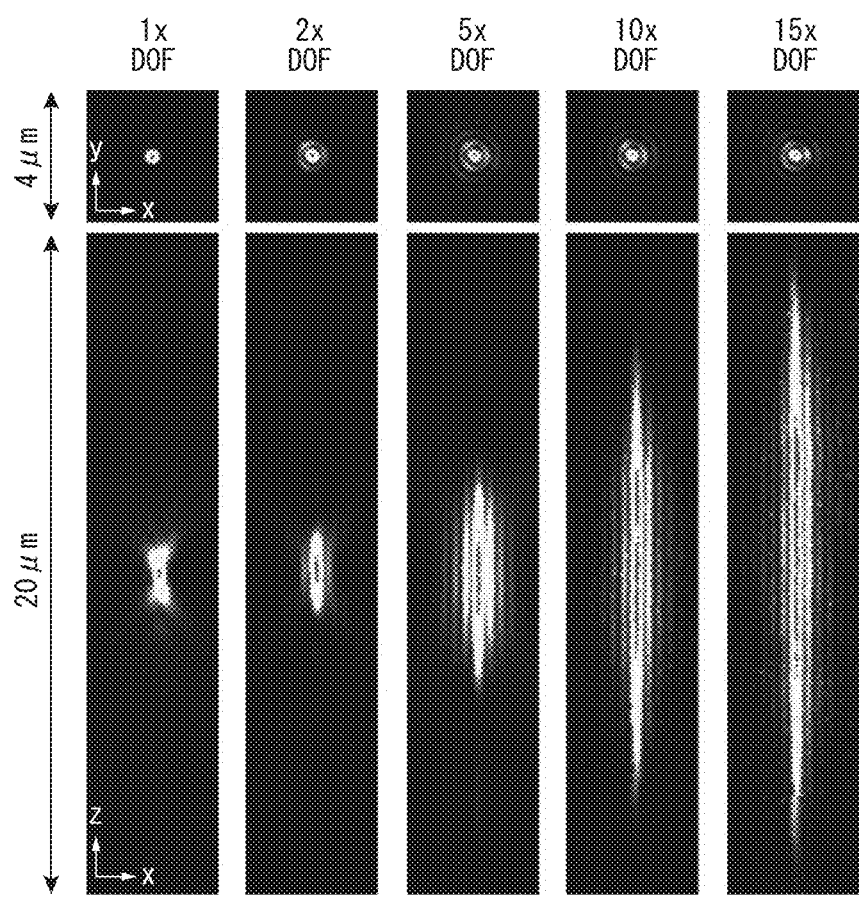
FIG. 11 is a view showing a measurement result of an intensity distribution in a case of typical light spot that is formed by focusing planar wave-shaped light beams (one times), and in a case where a needle spot-shaped spot is formed by setting an annular phase modulation pattern by an optical modulation part 14 shown in FIG. 10, and a depth of focus (DOF) is changed by two times, five times, ten times, and fifteen times with respect to the typical focused light spot in Example 2.
Figure 12A:
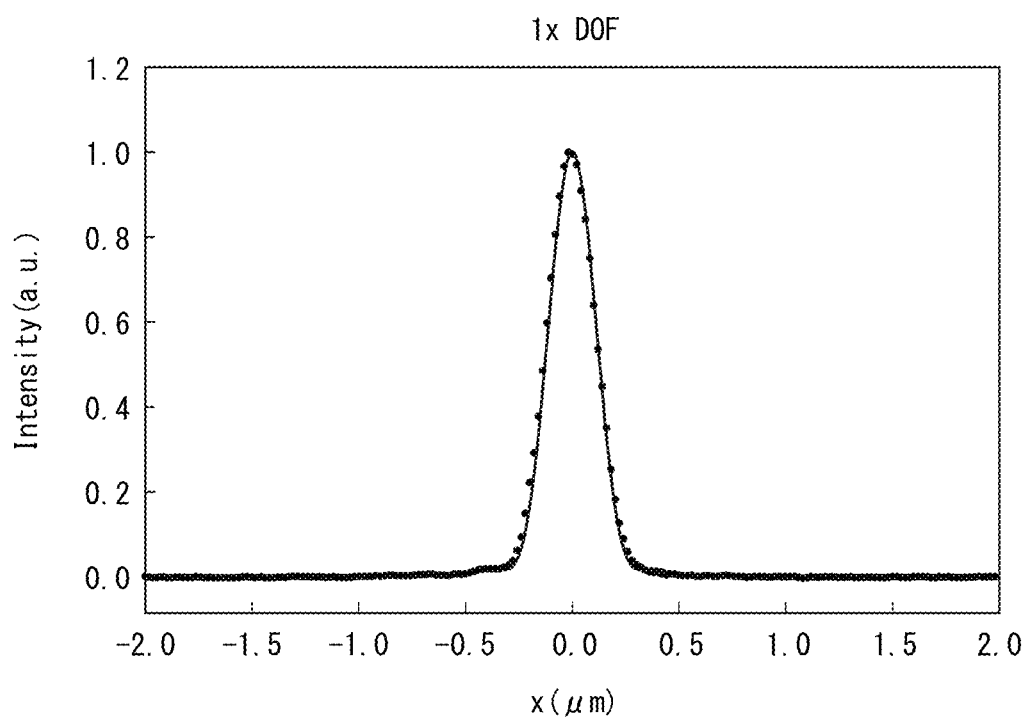
FIG. 12A is a graph showing a beam profile in an x direction in the intensity distribution of the typical light spot shown in FIG. 11.
Figure 12B:
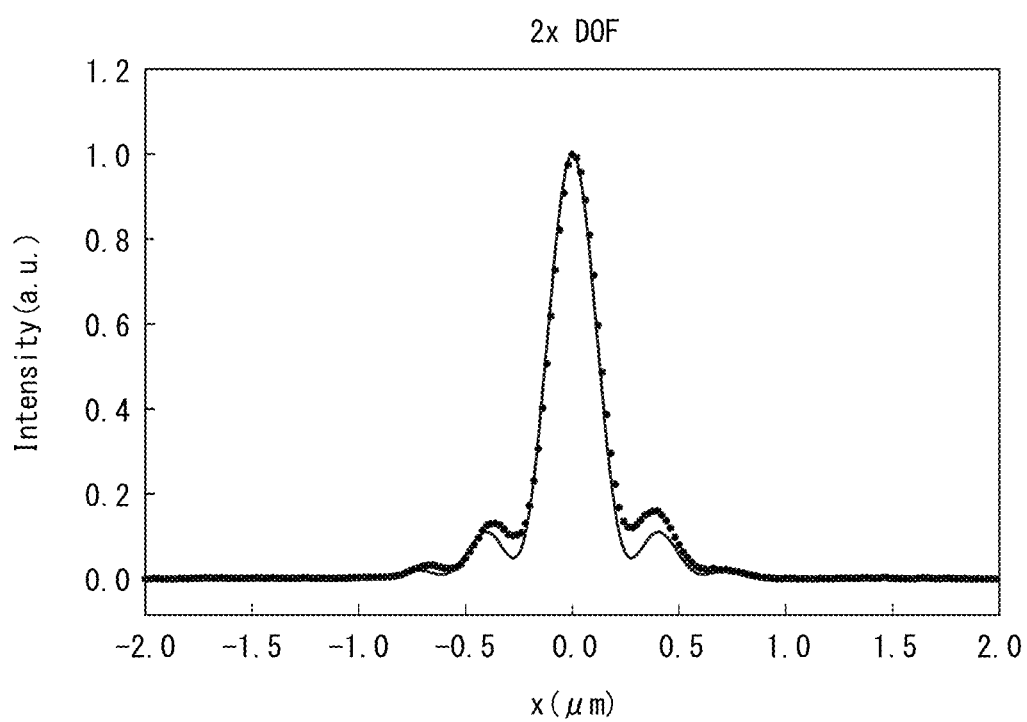
FIG. 12B is a graph showing a beam profile in the x direction in the intensity distribution in the case of changing the depth of focus of the needle-shaped light spot shown in FIG. 11 to two times.
Figure 12C:
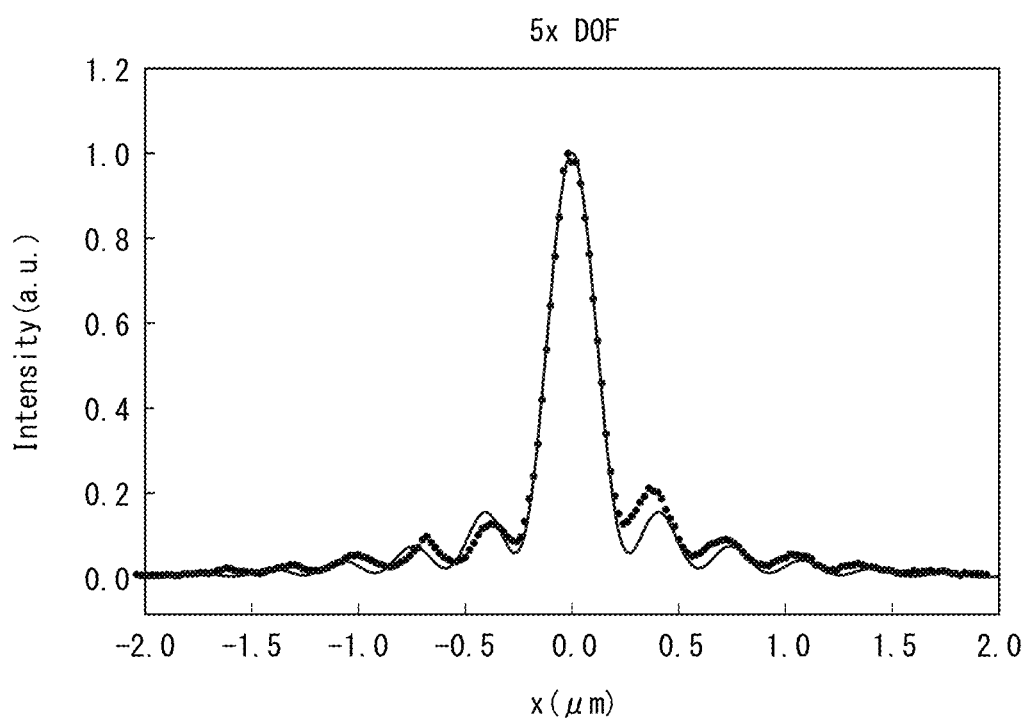
FIG. 12C is a graph showing a beam profile in the x direction in the intensity distribution in the case of changing the depth of focus of the needle-shaped light spot shown in FIG. 11 to five times.
Figure 12D:
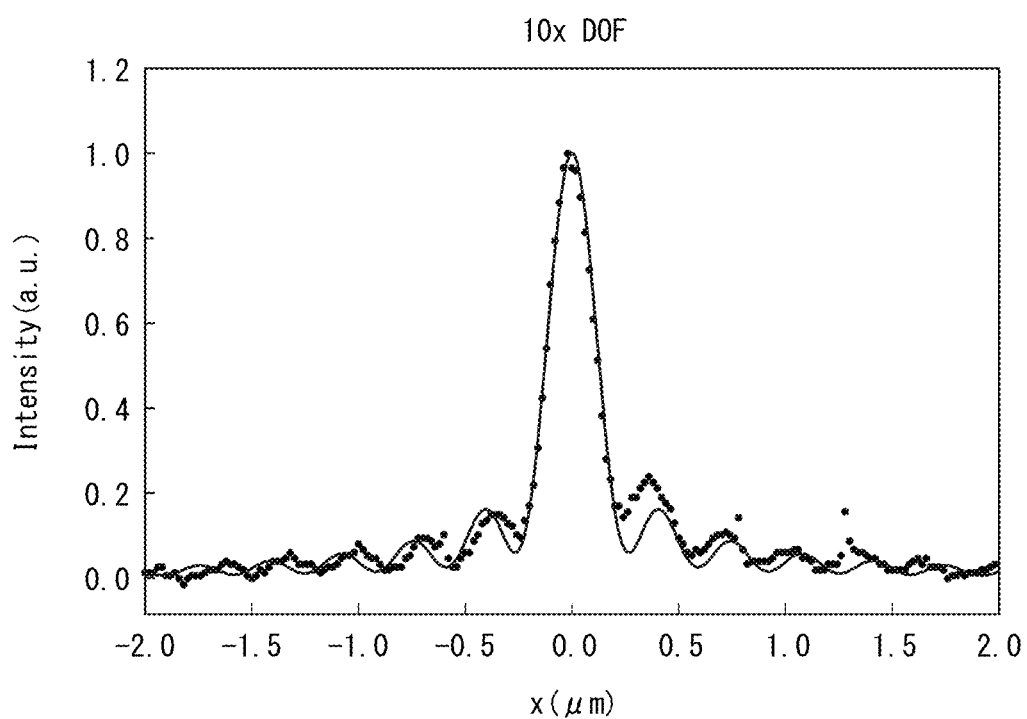
FIG. 12D is a graph showing a beam profile in the x direction in the intensity distribution in the case of changing the depth of focus of the needle-shaped light spot shown in FIG. 11 to ten times.
Figure 12E:
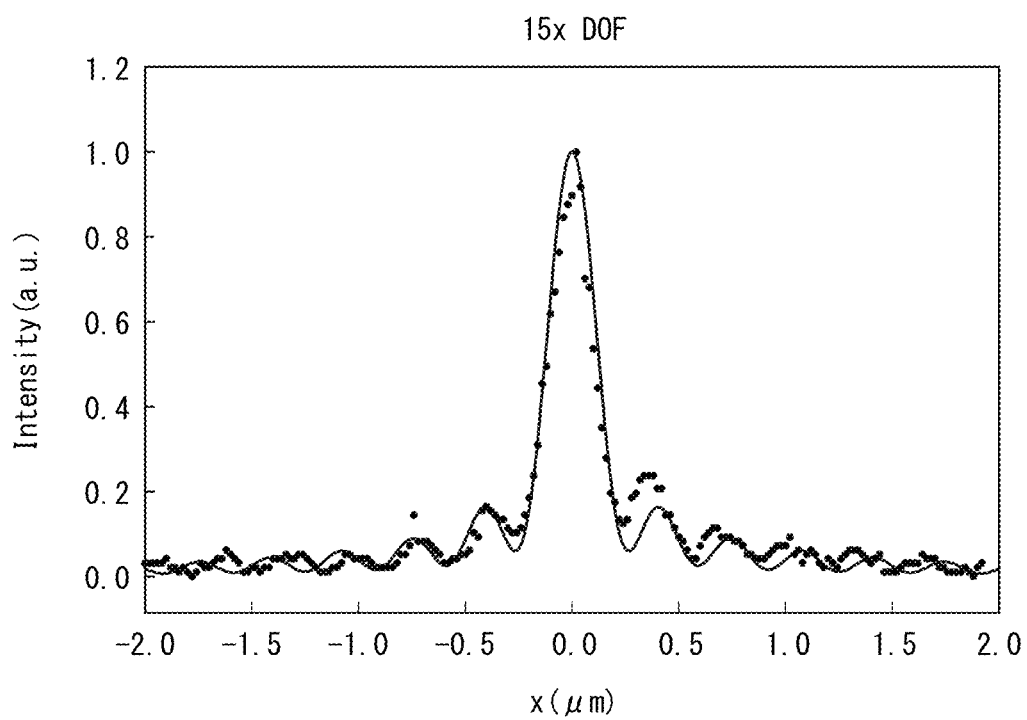
FIG. 12E is a graph showing a beam profile in the x direction in the intensity distribution in the case of changing the depth of focus of the needle-shaped light spot shown in FIG. 11 to fifteen times.
Figure 13A:
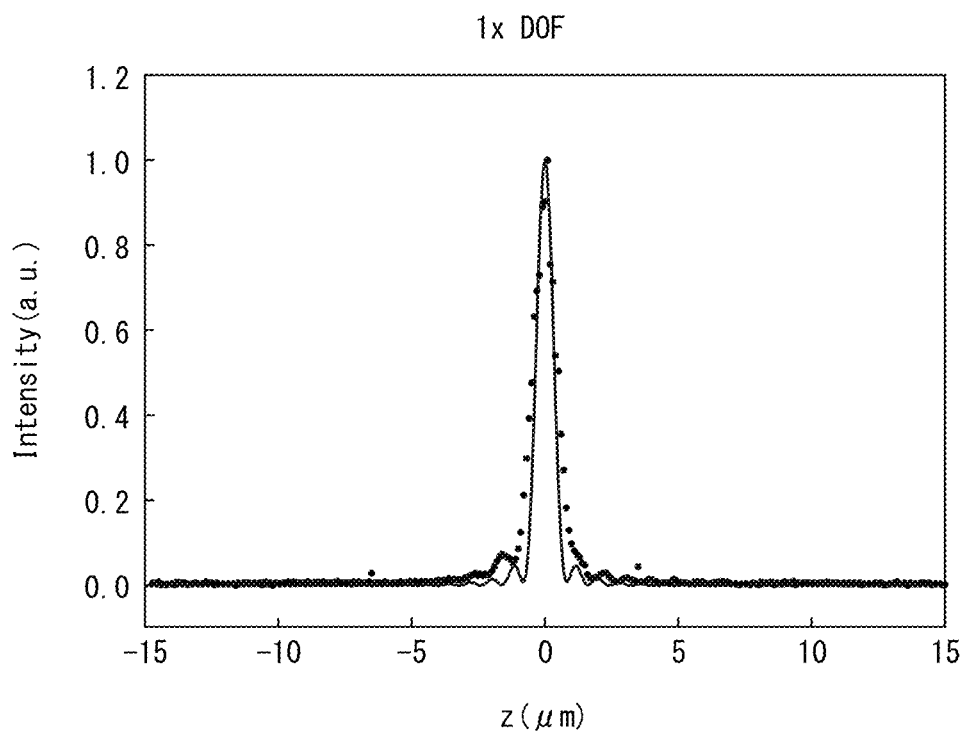
FIG. 13A is a graph showing a beam profile in a z direction in the intensity distribution of the typical light spot shown in FIG. 11.
Figure 13B:
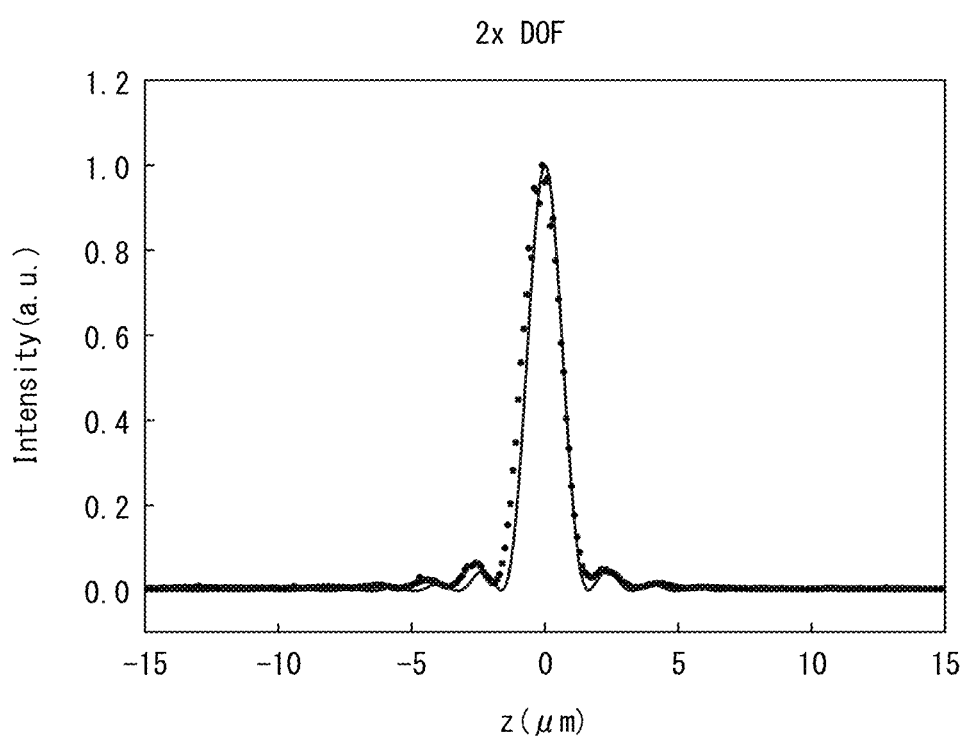
FIG. 13B is a graph showing a beam profile in the z direction in the intensity distribution in the case of changing the depth of focus of the needle-shaped light spot shown in FIG. 11 to two times.
Figure 13C:
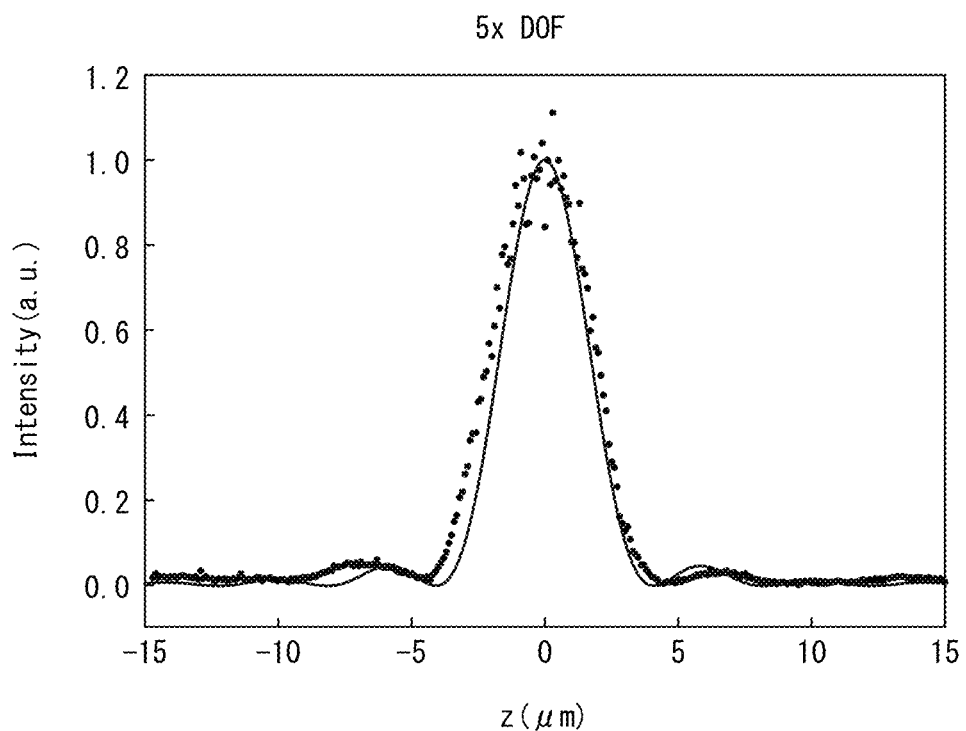
FIG. 13C is a graph showing a beam profile in the z direction in the intensity distribution in the case of changing the depth of focus of the needle-shaped light spot shown in FIG. 11 to five times.
Figure 13D:
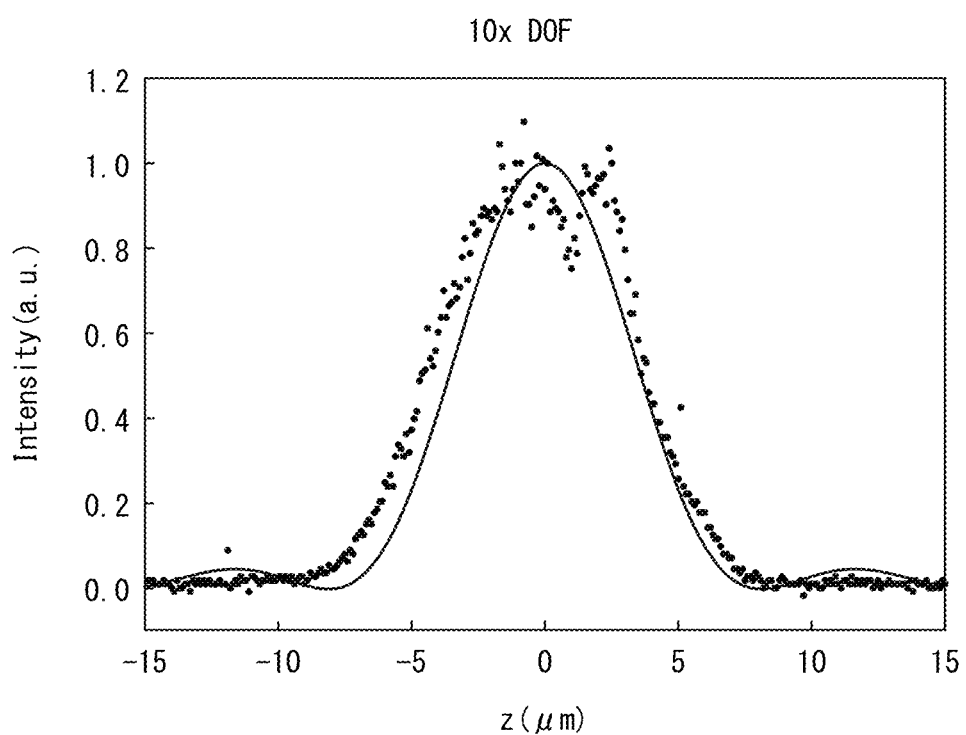
FIG. 13D is a graph showing a beam profile in the z direction in the intensity distribution in the case of changing the depth of focus of the needle-shaped light spot shown in FIG. 11 to ten times.
Figure 13E:
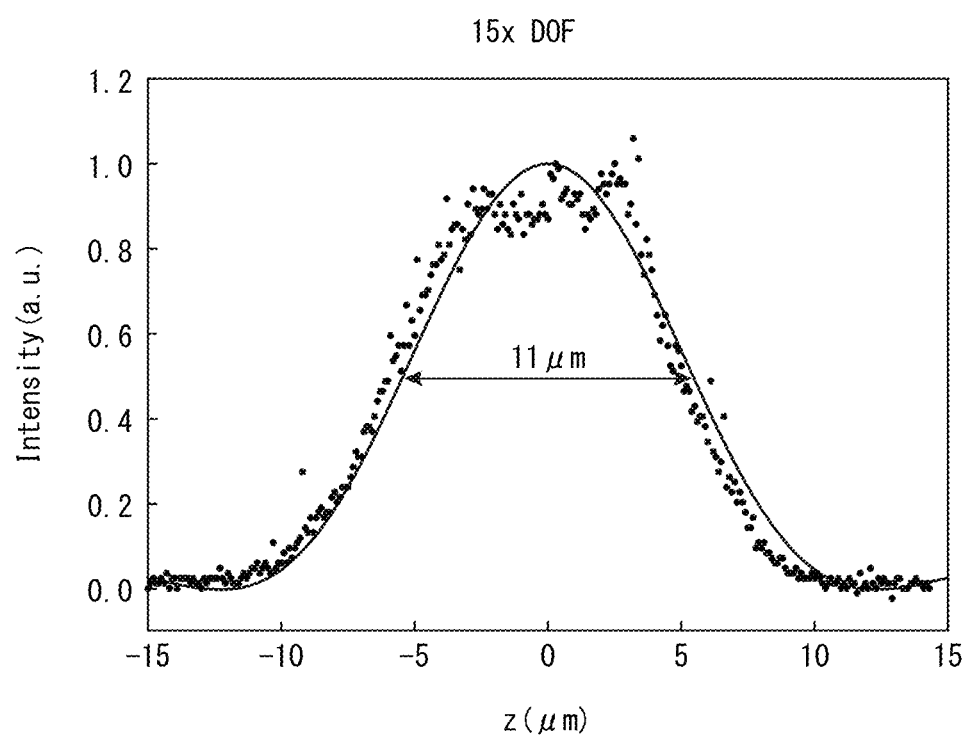
FIG. 13E is a graph showing a beam profile in the z direction in the intensity distribution in the case of changing the depth of focus of the needle-shaped light spot shown in FIG. 11 to fifteen times.

First, to perform verification of needle-shaped light spot formation in one-photon excitation by laser light having a wavelength of 532 nm, a commercially available fluorescent bead (average diameter: 170 nm) was three-dimensionally scanned, and a fluorescent signal at each point was detected by a confocal laser microscope detector (manufactured and distributed by Hamamatsu Photonics K.K) of the related art to measure an intensity distribution at a focal point. FIG. 11 shows measurement results of the intensity distribution in a case of a typical focused light spot obtained by focusing planar wave-shaped laser light (hereinafter, a depth of focus in this case may be set to one times and may be referred to as "basic depth of focus"), and a case where the depth of focus of the needle-shaped light spot was changed to two times, five times, ten times, and fifteen times, respectively. The depth of focus of the needle-shaped light spot was adjusted by changing a shape of an annular mask in the LCOS-SLM that is the optical modulation part 14. From measurement results, in the microscope system 110, it is assumed that the depth of focus of the needle-shaped light spot can be expanded to approximately fifteen times, and the length of the needle-shaped light spot can be enlarged to approximately 11 µm. That is, it was expected that it is possible to acquire depth information of the depth of focus that is fifteen times in comparison to a confocal laser microscope detector of the related art and the like. In addition, FIGS. 12A to 12E show beam profiles in the x-direction in respective intensity distributions in a case where the depth of focus of the needle-shaped light spot was not changed, and in a case where the depth of focus of the needle-shaped light spot was changed to two times, five times, ten times, and fifteen times, respectively, and FIGS. 13A to 13E shows beam profiles in the z-direction in the above-described cases. In FIGS. 12A to 12E and FIGS. 13A to 13E, a solid line shows a theoretical value, and a plurality of dot-shaped points represent measurement values. When considering conditions and parameters in the microscope system 110, it can be seen that the theoretical value and the measurement values tend to match each other.

Figure 14:
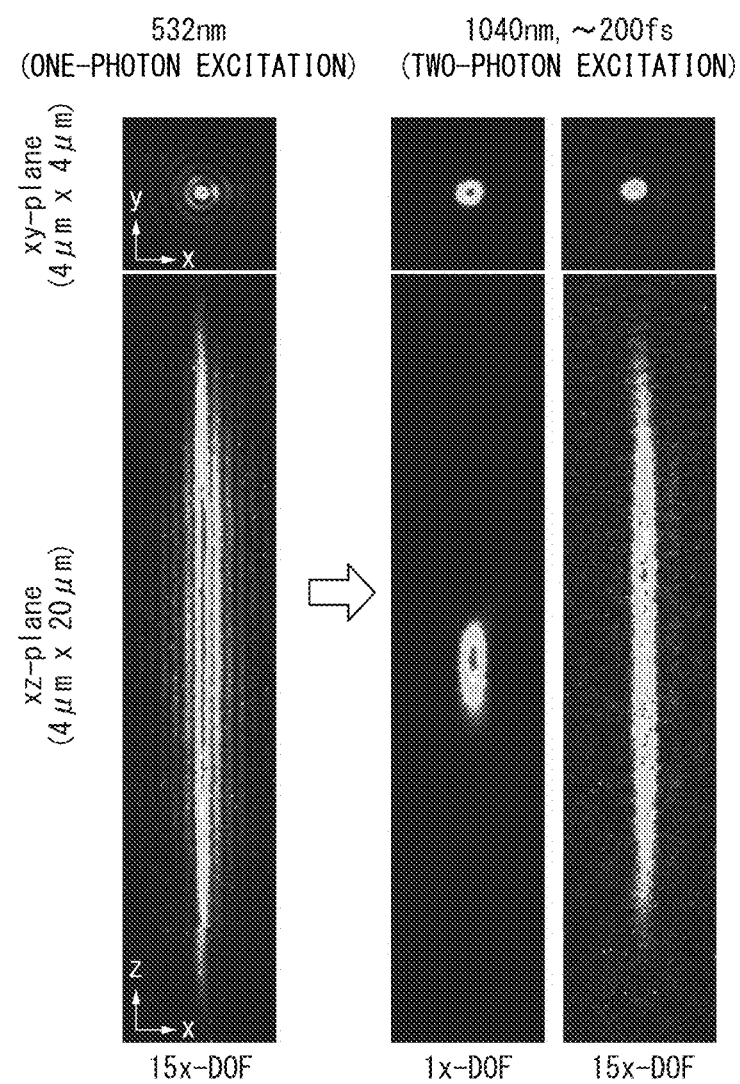
FIG. 14 is a view showing measurement results of an intensity distribution of needle-shaped light spot in one-photon excitation (depth of focus: fifteen times), and a typical focused light spot (depth of focus: one times) and needle-shaped light spot in which the depth of focus is set to fifteen times in two-photon excitation in Example 2.
Figure 15A:
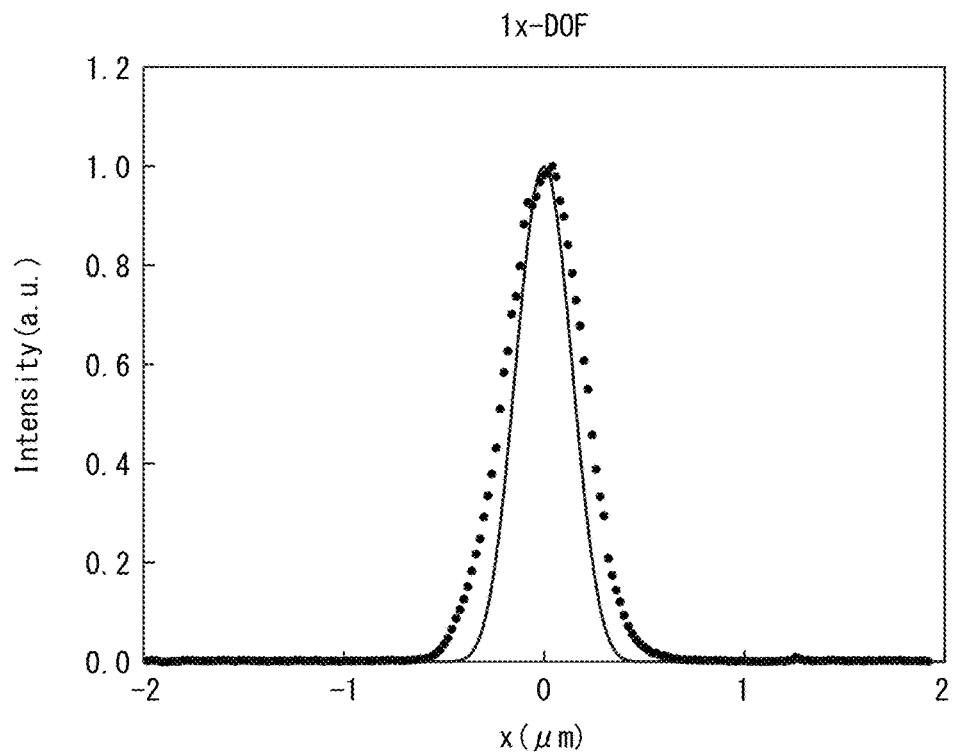
FIG. 15A is a graph showing a beam profile in the x direction in the intensity distribution of the typical focused light spot (depth of focus: one times) in the two-photon excitation shown in FIG. 14.
Figure 15B:
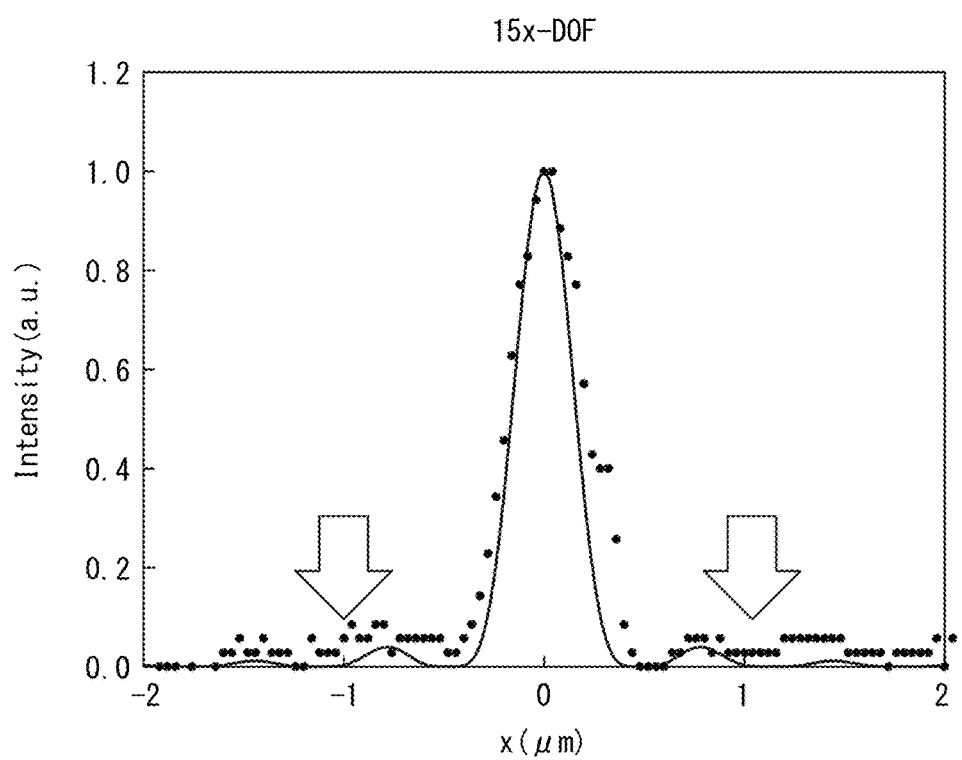
FIG. 15B is a graph showing a beam profile in the x direction in the intensity distribution of the needle-shaped light spot (depth of focus: fifteen times) in the two-photon excitation shown in FIG. 14.
Figure 16A:
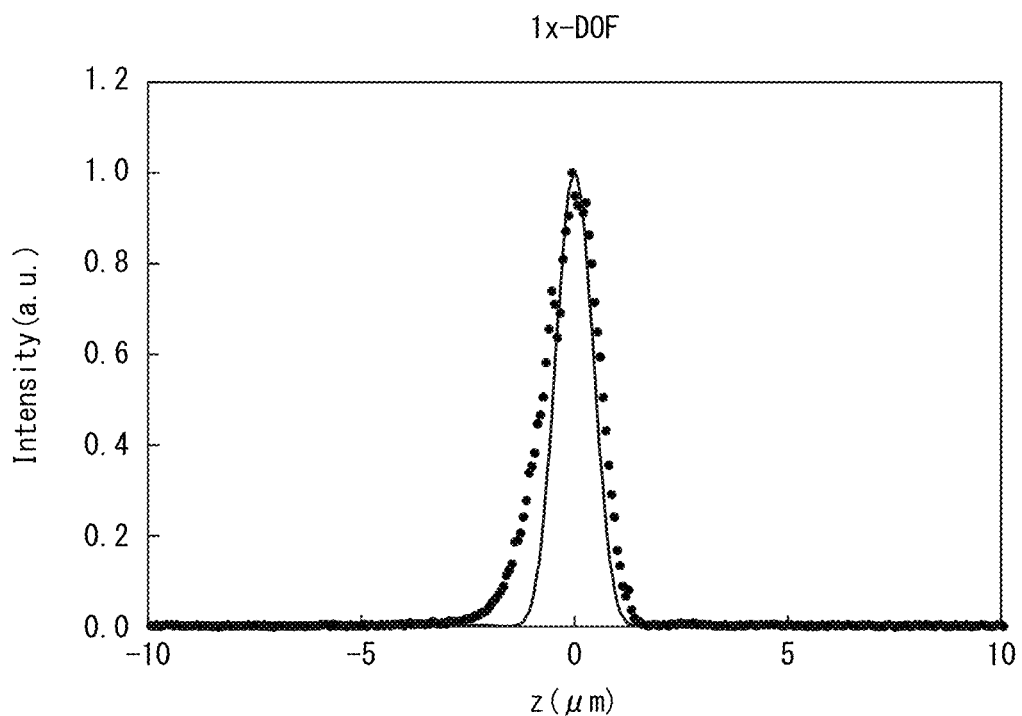
FIG. 16A is a graph showing a beam profile in the z direction in the intensity distribution of the typical focused light spot (depth of focus: one times) in the two-photon excitation shown in FIG. 14.
Figure 16B:
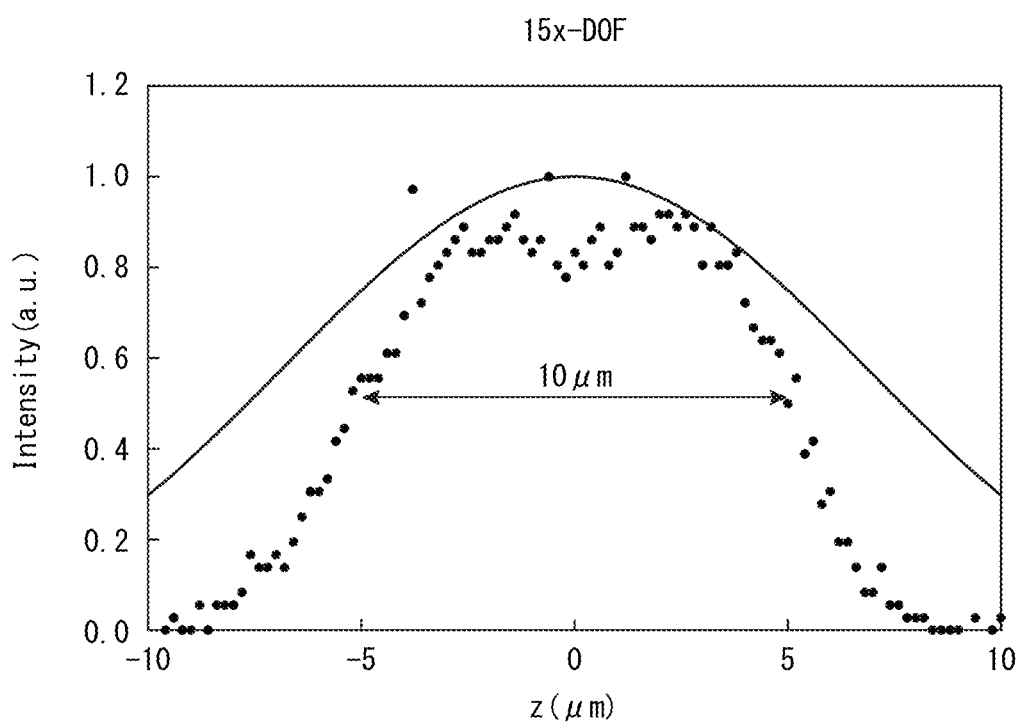
FIG. 16B is a graph showing a beam profile in the z direction in the intensity distribution of the needle-shaped light spot (depth of focus: fifteen times) in the two-photon excitation shown in FIG. 14.

Next, verification of needle-shaped light spot formation in two-photon excitation by pulse laser light having a wavelength of 1040 nm was performed. As a fluorescent bead, the same fluorescent bead as in verification in the one-photon excitation was used. FIG. 14 shows measurement results an intensity distribution of a fluorescent image (image when receiving an Airy beam pattern by the shifting light spot reception part 40) in one-photon excitation, and an intensity distribution of a fluorescent image in two-photon excitation in parallel. In the two-photon excitation, it can be seen that a side lobe in the x-direction was suppressed to be low. When the side lobe is suppressed to be low as described above, high-accuracy three-dimensional high-speed optical imaging with low noise is possible. FIG. 15A and FIG. 15B illustrate beam profiles in the x-direction in the intensity distribution of the fluorescent image in a case where the depth of focus of the needle-shaped light spot is a basic depth of focus (1×), and a case where the depth of focus of the needle-shaped light spot was a depth of focus of fifteen times (15×). When comparing the beam profiles shown in FIG. 15A and FIG. 15B, even in a case where the depth of focus of the needle-shaped light spot was set to be as large as fifteen times, it can be seen that the side lobe was greatly suppressed to be low as in portions indicated by an arrow. FIG. 16A and FIG. 16B illustrate beam profiles in the z-direction in the intensity distribution of the fluorescent image in a case where the depth of focus of the needle-shaped light spot is the basic depth of focus (1×) and in a case where the depth of focus of the needle-shaped light spot is a depth of focus of fifteen times (15×). Under conditions of two-photon excitation by laser light having a wavelength of 1040 nm that is also a near infrared wavelength region, a depth of focus of approximately 10 µm could be secured.

Figure 17:
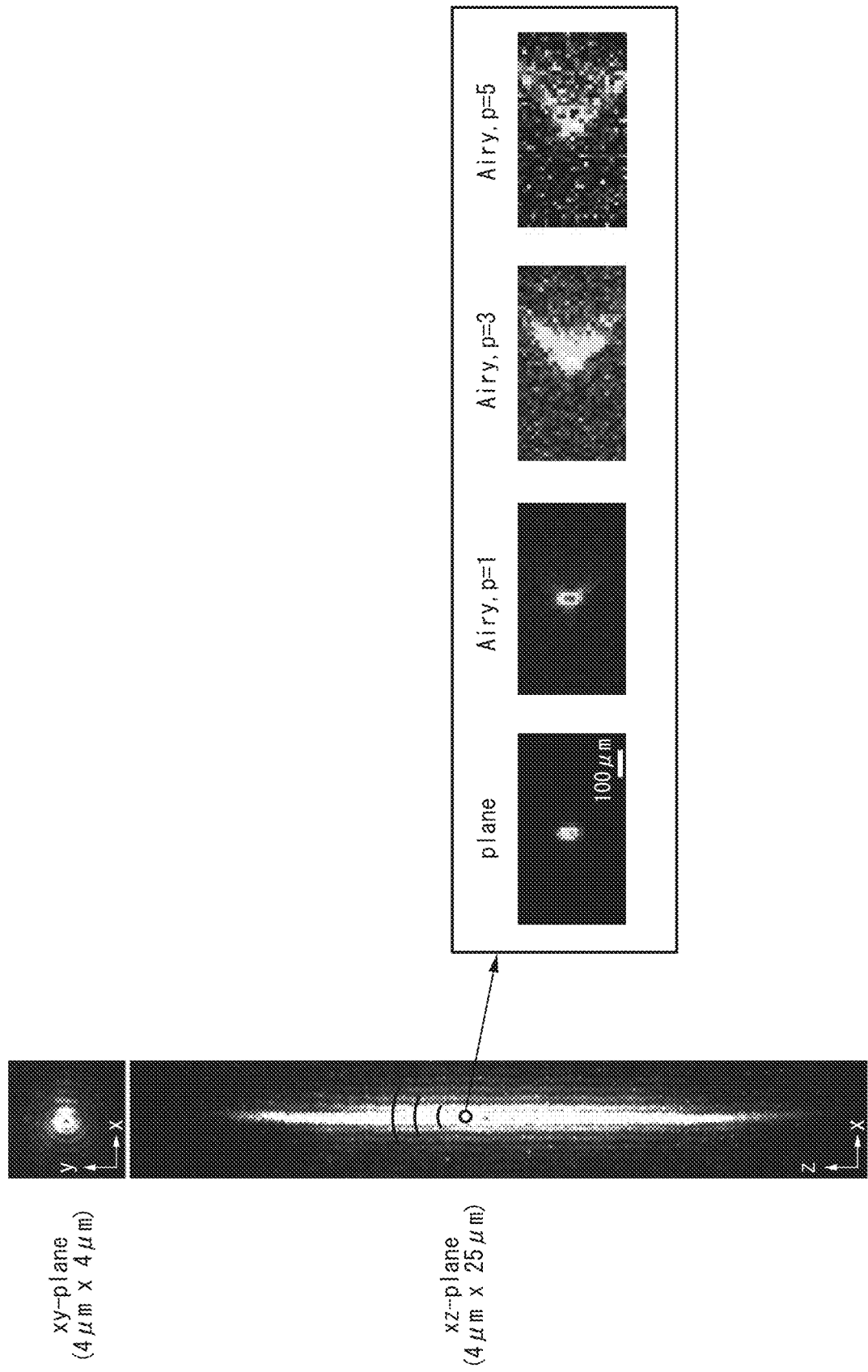
FIG. 17 is a view showing a fluorescent image (Airy beam pattern) of fluorescent bead on an EMCCD in Example 2.

As described above, in the optical system 110 for which satisfactory formation of the needle-shaped light spot was confirmed, verification of formation of an Airy beam pattern with respect to a fluorescent signal under one-photon excitation by the needle-shaped light spot was performed. FIG. 17 shows a value of p in Expression (1) and dimensions in respective planes of xyz in the one-photon excitation, and a fluorescent image of an isolated fluorescent bead on EMCCD. However, in the verification, h in Expression (1) was set to h=2$R_{eff}$. As shown in FIG. 17, it could be understood that an area pattern was formed with respect to light-emission from a fluorescent bead on the needle-shaped light spot.

Figure 18:
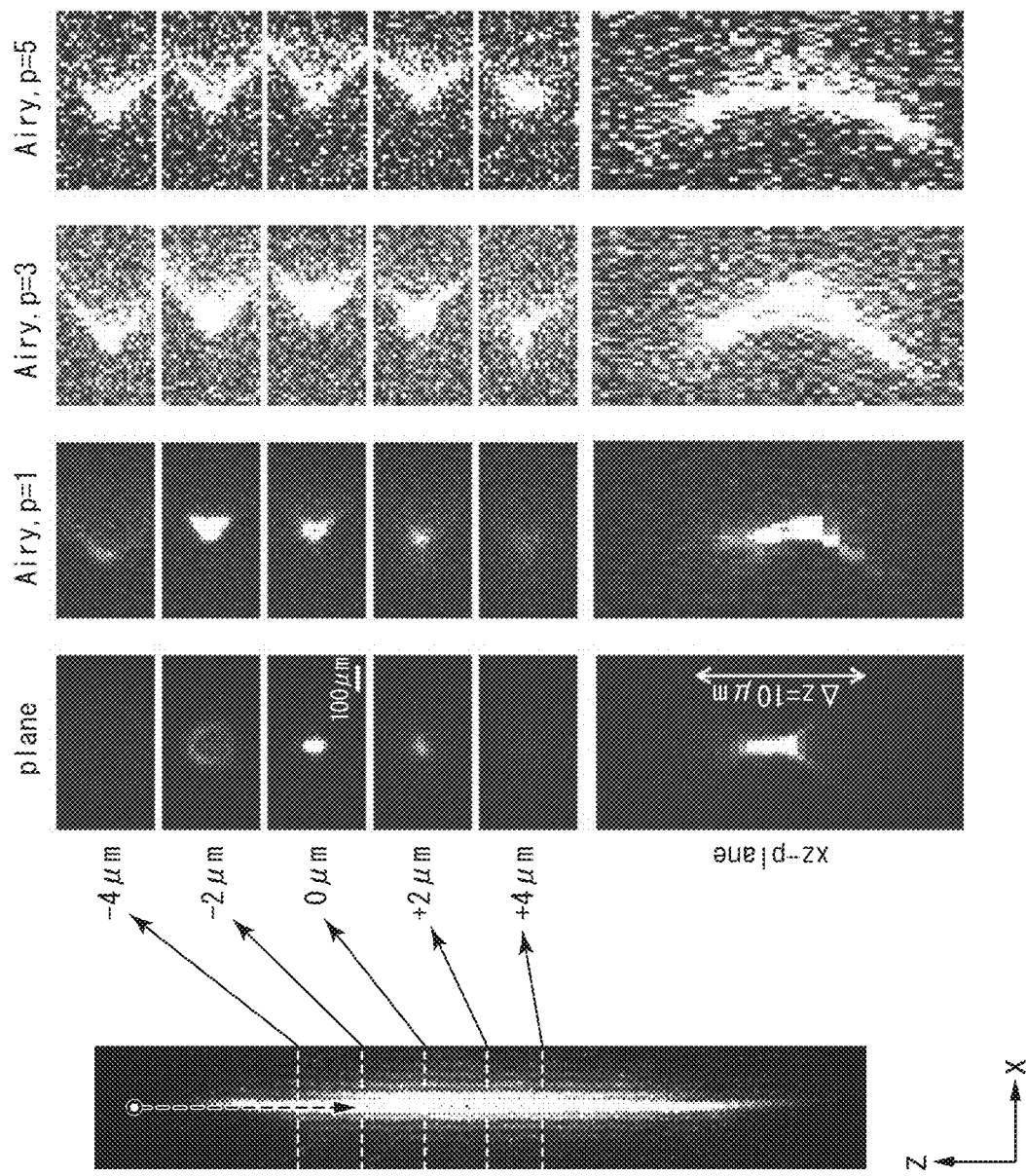
FIG. 18 is a view showing a fluorescent image in a case where the fluorescent bead is scanned along needle-shaped light spot in Example 2.

In addition, FIG. 18 shows a variation of the fluorescent image in a case where the fluorescent bead was scanned along the needle-shaped light spot (that is, along the z-direction). The fluorescent bead was moved at an interval of 500 nm. From measurement results shown in FIG. 18, it can be seen that as the value of the parameter p increases, a propagation distance accompanied with non-diffraction property of the Airy beam pattern with respect to the z-direction increases, and the Airy beam pattern shifts in an xy in-plane direction in correspondence with a position of the focus of the fluorescent bead in the z-direction.

Figure 19:
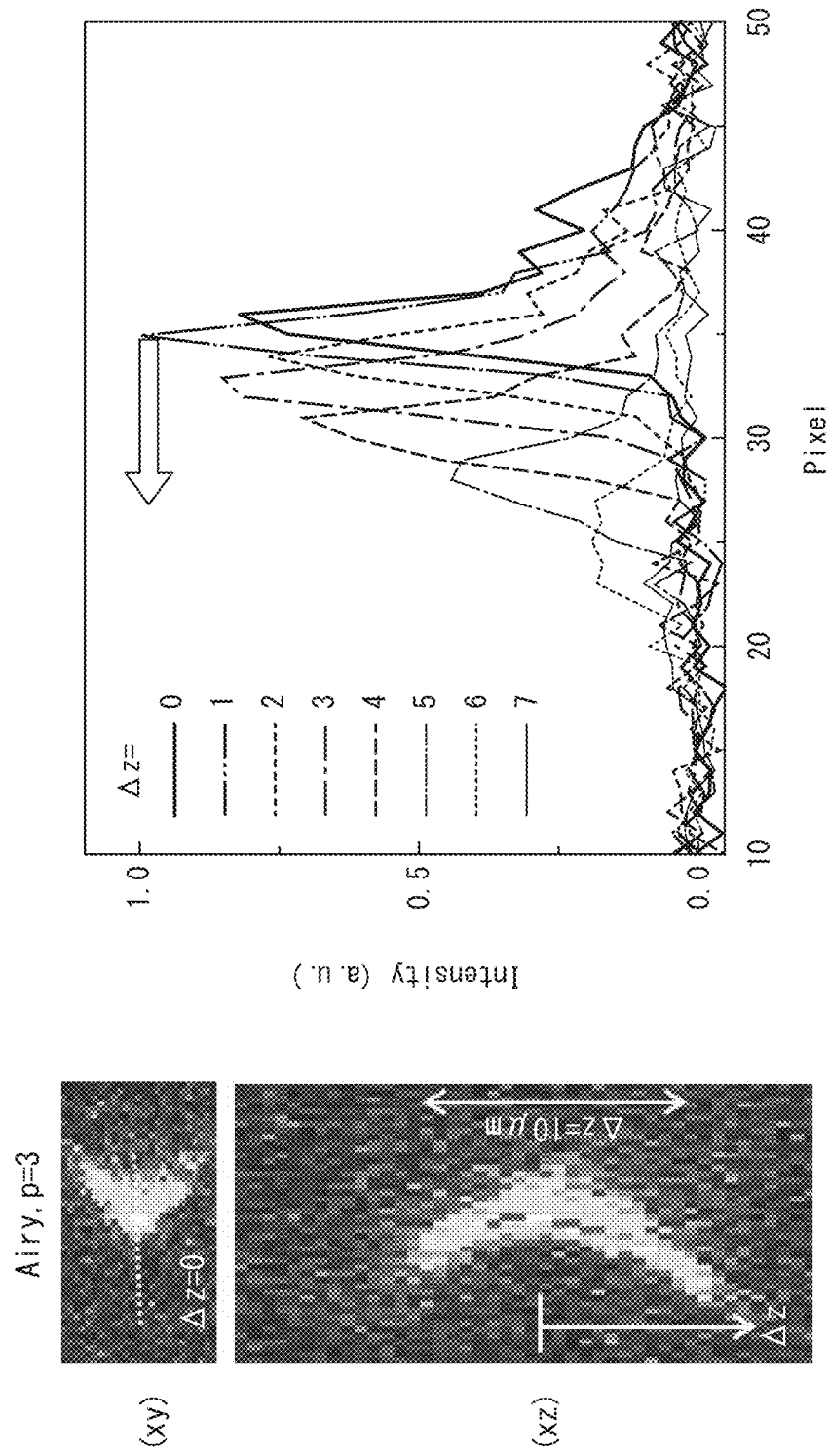
FIG. 19 is a view showing an intensity distribution of the airy Airy beam pattern on the EMCCD in the x direction, and is a view showing an intensity distribution of the fluorescent image when moving the fluorescent bead from a focal position ($\Delta z=0$) to $\Delta z=7$ μm in Example 2.

In addition, with regard to the parameter p, p was set to 3, and the fluorescent bead was moved from the focus of the needle-shaped light spot in the z-direction by 0 µm to 7 µm at an interval of 1 µm. FIG. 19 shows an intensity distribution along the x-direction that passes through the center of the fluorescent image on the EMCCD at each position. From measurement results shown in FIG. 19, it can be seen that a peak position of the Airy beam pattern on the EMCCD shifts to the xy in-plane direction in correspondence with a position of the fluorescent bead in the z-direction on the needle-shaped light spot.

Figure 20:
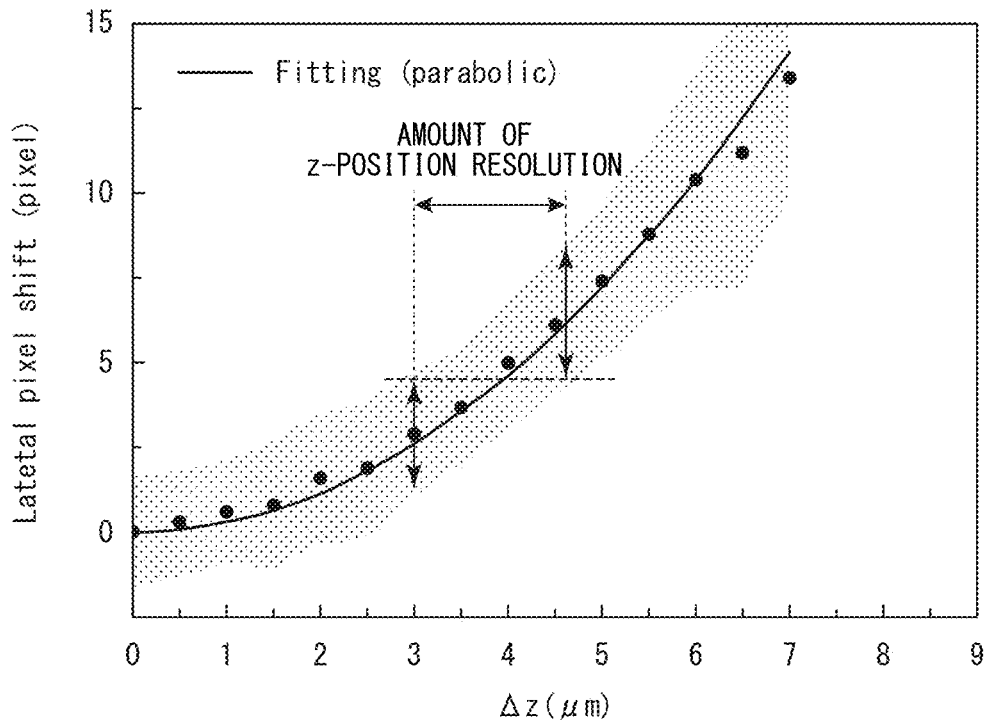
FIG. 20 is a view showing a relationship between a shift amount and a spot size in an xy-plane (plane that is expanded in the x direction and a y direction) of a spot of an Airy beam in Example 2.

FIG. 20 shows a relationship between a position of the fluorescent bead in the z-direction on the needle-shaped light spot, and a shift amount in the xy-plane of the spot of the Airy beam in a light reception part. A shadow in FIG. 20 corresponds to a full-width at half-maximum (FWHM) with respect to an in-plane direction of the central spot of the Airy beam. A spot position draws a parabolic trajectory, but a spot size is approximately constant with respect to a propagation distance. Accordingly, it is assumed that spatial resolution in the z-direction is obtained by using non-diffraction and a self-bending property of the Airy beam, and spatial resolution in the z-direction (depth direction) depends on a z-position from which fluorescence is emitted. In addition, from the viewpoint of securing spatial resolution in the z-direction in imaging, it can be seen that a shift amount of the Airy beam in the xy-plane is necessary to be equal to or greater than an in-plane spot size of the Airy beam.

Figure 21:
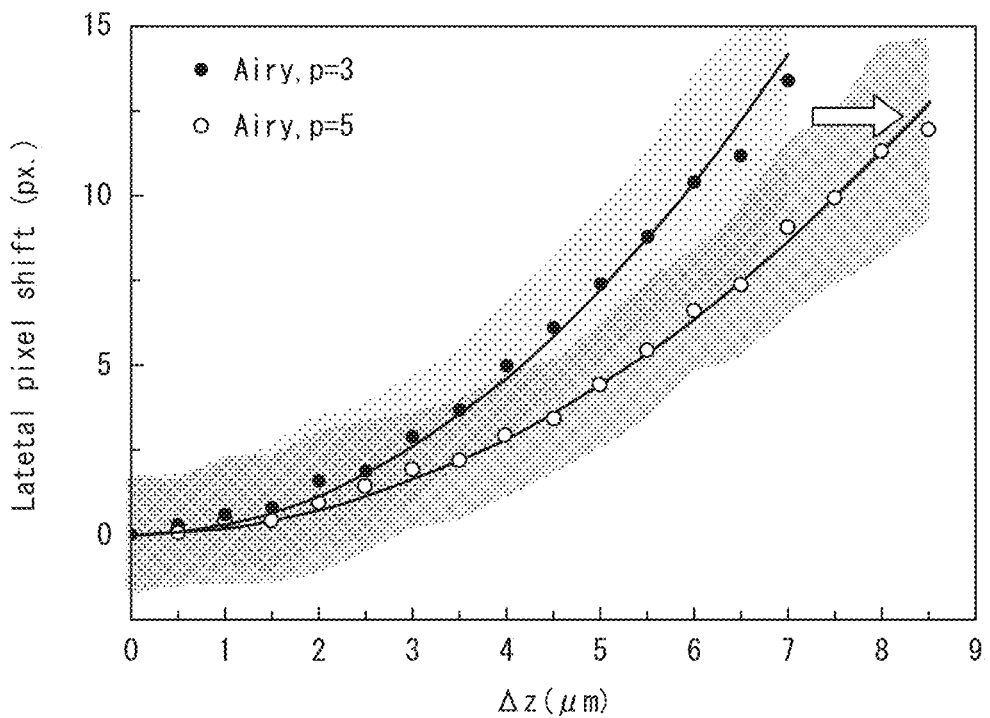
FIG. 21 is a view showing a relationship between a shift amount and a spot size in the xy-plane of the spot of the Airy beam in a case where a parameter p is p=3 and p=5 in Example 2.

FIG. 21 shows a relationship between the z-position on the needle-shaped light spot and the shift amount in the xy-plane of the Airy beam spot in the light reception part in a case where the parameter p was set to 3 and 5. As shown in FIG. 21, the greater the value of the parameter p is, the further the in-plane shift amount of the Airy beam spot in the shifting light spot reception part 40 with respect to a variation of the position in the z-direction on the needle-shaped light spot decreases. On the other hand, the greater the value of the parameter p, a non-diffraction propagation distance of the Airy beam increases. Accordingly, the spatial resolution with respect to the z-direction (depth direction) and a detectable range in the z-direction have a trade-off relationship. It is assumed that conditions in the three-dimensional high-speed imaging are determined by adjusting appropriately various parameters such as the parameter p, an imaging magnification of the optical system, and a wavelength of the emission light on the basis of the trade-off relationship.

The invention claimed is:

1. An optical information detection apparatus, comprising:
    a needle-shaped light spot irradiation part that is configured to generate a needle-shaped light spot that is concentrated over a length dimension greater than a width dimension concentrated in a direction orthogonal to a first optical axis along the first optical axis, and irradiate a detection object with the needle-shaped light spot;
    a shifting light spot conversion part that is configured to convert emission light emitted from a position on the first optical axis inside an irradiation region of the needle-shaped light spot in the detection object into a shifting light spot that shifts so that a focusing position on a light-receiving plane intersecting a second optical axis varies in correspondence with the position, from which the emission light is emitted, on the first optical axis in the detection object in accordance with movement of the emission light along the second optical axis;
    a shifting light spot reception part that is configured to receive the shifting light spot along the light-receiving plane; and
    an optical information acquisition part that is configured to acquire optical information of the emission position of the emission light from the shifting light spot received by the shifting light spot reception part.

2. The optical information detection apparatus according to claim 1,
    wherein the needle-shaped light spot irradiation part includes,
    a light source,
    an optical modulation part that is configured to modulate light emitted from the light source to convert the light emitted from the light source into the needle-shaped light spot, and
    a needle-shaped light spot generation part that is configured to focus the light modulated by the optical modulation part to the detection object, and generate the needle-shaped light spot.

3. The optical information detection apparatus according to claim 1,
    wherein the needle-shaped light spot is a Bessel beam having a high-optical-intensity portion on the first optical axis.

4. The optical information detection apparatus according to claim 1,
    wherein the shifting light spot conversion part includes,
    an emission light modulation part that is configured to convert the emission light into the shifting light spot through modulation of the emission light.

5. The optical information detection apparatus according to claim 4,
    wherein the emission light modulation part is configured to modulate along the second optical axis in common the emission light emitted from a plurality of the positions which are different from each other on the first optical axis inside the irradiation region of the needle-shaped light spot in the detection object.

6. The optical information detection apparatus according to claim 1,
    wherein the shifting light spot is an Airy beam that is curved in a parabolic shape with respect to the second optical axis.

7. The optical information detection apparatus according to claim 1,
    wherein the shifting light spot conversion part is configured to convert the emission light from a plurality of the positions which are different from each other on the first optical axis inside the irradiation region of the needle-shaped light spot in the detection object collectively into the shifting light spot.

8. A microscope system, comprising:
    a needle-shaped light spot irradiation part that is configured to generate a needle-shaped light spot that is concentrated over a length dimension greater than a width dimension concentrated in a direction orthogonal to a first optical axis along the first optical axis, and irradiate a detection object with the needle-shaped light spot;
    a shifting light spot conversion part that is configured to convert emission light emitted from a position on the first optical axis inside an irradiation region of the needle-shaped light spot in the detection object into shifting light spot that shifts so that a focusing position on a light-receiving plane intersecting a second optical axis varies in correspondence with the position, from which the emission light is emitted, on the first optical axis in the detection object in accordance with movement of the emission light along the second optical axis;
    a shifting light spot reception part that is configured to receive the shifting light spot along the light-receiving plane;
    an optical information acquisition part that is configured to acquire optical information of the emission position of the emission light from the shifting light spot received by the shifting light spot reception part; and an image information creation part that is configured to create image information related to the detection object on the basis of optical information that is acquired from the shifting light spot by the optical information acquisition part.

* * * * *